United States Patent

Chen et al.

(10) Patent No.: US 9,341,819 B2
(45) Date of Patent: May 17, 2016

(54) MOBILE DEVICE AND OPTICAL IMAGING LENS THEREOF

(71) Applicant: GENIUS ELECTRONIC OPTICAL CO., LTD., Taichung (TW)

(72) Inventors: Shih Han Chen, Taichung (TW); Hung Chien Hsieh, Taichung (TW); Long Ye, Xiamen (CN)

(73) Assignee: GENIUS ELECTRONIC OPTICAL CO., LTD. (TW)

( * ) Notice: Subject to any disclaimer, the term of this patent is extended or adjusted under 35 U.S.C. 154(b) by 0 days.

(21) Appl. No.: 14/194,123

(22) Filed: Feb. 28, 2014

(65) Prior Publication Data

US 2015/0070784 A1  Mar. 12, 2015

(30) Foreign Application Priority Data

Sep. 6, 2013  (CN) .......................... 2013 1 0403008

(51) Int. Cl.
*G02B 3/02* (2006.01)
*G02B 13/00* (2006.01)

(52) U.S. Cl.
CPC ................................. *G02B 13/0045* (2013.01)

(58) Field of Classification Search
CPC ........ G02B 9/62; G02B 13/18; G02B 13/001; G02B 13/002; G02B 13/0015; G02B 13/0045; G02B 27/0025; G02B 3/02; G02B 13/04; G02B 3/04
USPC ................. 359/708, 754, 756, 757, 739, 740, 359/713–715
See application file for complete search history.

(56) References Cited

U.S. PATENT DOCUMENTS

| 7,164,539 | B2 | 1/2007 | Tomioka |
| 8,355,215 | B2 | 1/2013 | Asami |
| 8,432,619 | B2 | 4/2013 | Huang |
| 8,472,128 | B2 | 6/2013 | Huang |
| 8,477,431 | B2 | 7/2013 | Huang |
| 8,514,499 | B2 | 8/2013 | Hsu et al. |
| 2012/0021802 | A1* | 1/2012 | Sano et al. ................. 455/556.1 |
| 2012/0194726 | A1 | 8/2012 | Huang et al. |
| 2013/0120858 | A1* | 5/2013 | Sano ............................ 359/713 |
| 2013/0314804 | A1 | 11/2013 | Kubota et al. |
| 2014/0043695 | A1 | 2/2014 | Hsu et al. |
| 2014/0160580 | A1* | 6/2014 | Nishihata et al. ............ 359/708 |

FOREIGN PATENT DOCUMENTS

| CN | 202886714 U | 4/2013 |
| TW | 201039622 | 11/2010 |
| TW | 201250283 A1 | 12/2012 |
| TW | 201250333 | 12/2012 |

OTHER PUBLICATIONS

Official Action from Taiwan Patent Application No. 102136069 dated on Sep. 16, 2014.

* cited by examiner

*Primary Examiner* — James Greece
(74) *Attorney, Agent, or Firm* — Baker & McKenzie LLP

(57) ABSTRACT

The present invention provides a mobile device and an optical imaging lens thereof. The optical imaging lens comprises a first lens element, a second lens element, a third lens element, a fourth lens element, a fifth lens element, and a sixth lens element positioned in an order from an object side to an image side. Through controlling the convex or concave shape of the surfaces and/or the refracting power of the lens elements, the optical imaging lens shows better image performance and the total length of the optical imaging lens is shortened.

20 Claims, 33 Drawing Sheets

| f(Focus)=4.149 mm, HFOV(Half angular field of view)= 37.498deg., System length=4.514mm, Fno= 2.01, Image height=3.085mm ||||||||
|---|---|---|---|---|---|---|---|
| Surface # | | Radius | Thickness | Refractive index | Abbe number | Focus | Material |
| - | Object | ∞ | ∞ | | | | |
| 111 | 1st lens element | 2.274 | 0.492 | 1.544 | 56.114 | 10.948 | plastic |
| 112 | | 3.390 | 0.135 | | | | |
| 100 | Aperture stop | ∞ | 0.020 | | | | |
| 121 | 2nd lens element | 2.418 | 0.708 | 1.544 | 56.114 | 4.007 | plastic |
| 122 | | -20.527 | 0.060 | | | | |
| 131 | 3rd lens element | -18.217 | 0.240 | 1.636 | 23.972 | -5.309 | plastic |
| 132 | | 4.200 | 0.431 | | | | |
| 141 | 4th lens element | -11.228 | 0.664 | 1.535 | 55.635 | 4.137 | plastic |
| 142 | | -1.891 | 0.090 | | | | |
| 151 | 5th lens element | -4.144 | 0.449 | 1.535 | 55.635 | 8.094 | plastic |
| 152 | | -2.200 | 0.096 | | | | |
| 161 | 6th lens element | -5.887 | 0.629 | 1.535 | 55.635 | -2.834 | plastic |
| 162 | | 2.125 | 0.500 | | | | |
| 171 | IR cut filter | ∞ | 0.300 | | | | |
| 172 | | ∞ | 0.487 | | | | |
| 180 | Image plane | ∞ | | | | | |

FIG. 4

| Aspherical parameters | | | | | | |
|---|---|---|---|---|---|---|
| Surface # | 111 | 112 | 121 | 122 | 131 | 132 |
| K | -1.67805E+00 | -3.10350E+01 | -5.64403E+00 | -5.65080E+02 | 0.00000E+00 | 1.02540E+01 |
| $a_4$ | 0.00000E+00 | 0.00000E+00 | -1.37729E-02 | -1.38937E-03 | 6.47223E-02 | 6.39469E-02 |
| $a_6$ | 0.00000E+00 | 0.00000E+00 | 1.49391E-02 | 6.37298E-03 | -7.21196E-02 | -9.54924E-02 |
| $a_8$ | 0.00000E+00 | 0.00000E+00 | 8.21323E-03 | -1.90708E-02 | 1.58930E-02 | 3.17825E-02 |
| $a_{10}$ | 0.00000E+00 | 0.00000E+00 | -7.49916E-03 | -1.02767E-02 | 2.05247E-04 | 3.76956E-03 |
| $a_{12}$ | 0.00000E+00 | 0.00000E+00 | -4.57423E-03 | 1.52949E-03 | 5.55712E-04 | -4.09431E-03 |
| $a_{14}$ | 0.00000E+00 | 0.00000E+00 | 0.00000E+00 | 0.00000E+00 | 0.00000E+00 | 0.00000E+00 |
| $a_{16}$ | 0.00000E+00 | 0.00000E+00 | 0.00000E+00 | 0.00000E+00 | 0.00000E+00 | 0.00000E+00 |
| Surface # | 141 | 142 | 151 | 152 | 161 | 162 |
| K | 0.00000E+00 | -3.56466E+00 | 0.00000E+00 | 0.00000E+00 | 0.00000E+00 | -9.63683E+00 |
| $a_4$ | 2.11306E-02 | -6.32172E-02 | -2.70168E-03 | 1.21145E-01 | -4.54174E-02 | -6.60263E-02 |
| $a_6$ | -6.24049E-02 | 1.04182E-02 | 3.74957E-03 | -3.27121E-02 | 1.45994E-02 | 2.16114E-02 |
| $a_8$ | 4.67304E-02 | 4.51238E-03 | -2.33920E-03 | 3.78810E-03 | 2.45744E-03 | -5.65248E-03 |
| $a_{10}$ | -8.08825E-03 | 2.10953E-03 | -5.13756E-03 | 1.48835E-04 | -1.06367E-03 | 6.45946E-04 |
| $a_{12}$ | -4.65800E-03 | 1.43395E-03 | 3.20748E-03 | 4.23853E-05 | 7.96363E-06 | 3.04449E-06 |
| $a_{14}$ | 2.86992E-04 | 8.04406E-05 | -5.81712E-04 | 3.24141E-05 | 2.52924E-05 | -5.62072E-06 |
| $a_{16}$ | -3.26386E-04 | -3.33871E-04 | 3.42226E-05 | 3.67359E-06 | 2.15073E-06 | 2.83279E-07 |

FIG. 5

| f(Focus)=4.182 mm, HFOV(Half angular field of view)= 37.114deg., System length=4.490mm, Fno= 2.091, Image height=3.085mm ||||||||
|---|---|---|---|---|---|---|---|
| Surface # | | Radius | Thickness | Refractive index | Abbe number | Focus | Material |
| - | Object | ∞ | ∞ | | | | |
| 211 | 1st lens element | 2.411 | 0.428 | 1.544 | 56.114 | 15.637 | plastic |
| 212 | | 3.146 | 0.157 | | | | |
| 200 | Aperture stop | ∞ | 0.020 | | | | |
| 221 | 2nd lens element | 2.251 | 0.681 | 1.544 | 56.114 | 3.662 | plastic |
| 222 | | -15.967 | 0.097 | | | | |
| 231 | 3rd lens element | -17.672 | 0.240 | 1.636 | 23.972 | -5.298 | plastic |
| 232 | | 4.220 | 0.507 | | | | |
| 241 | 4th lens element | -9.160 | 0.625 | 1.535 | 55.635 | 4.148 | plastic |
| 242 | | -1.832 | 0.130 | | | | |
| 251 | 5th lens element | -4.773 | 0.432 | 1.535 | 55.635 | 7.974 | plastic |
| 252 | | -2.327 | 0.140 | | | | |
| 261 | 6th lens element | -7.080 | 0.532 | 1.535 | 55.635 | -2.730 | plastic |
| 262 | | 1.894 | 0.500 | | | | |
| 271 | IR cut filter | ∞ | 0.300 | | | | |
| 272 | | ∞ | 0.511 | | | | |
| 280 | Image plane | ∞ | | | | | |

FIG. 8

| Aspherical parameters | | | | | | |
|---|---|---|---|---|---|---|
| Surface # | 211 | 212 | 221 | 222 | 231 | 232 |
| K | -2.95231E+00 | -2.39563E+01 | -4.16743E+00 | -2.73708E+02 | 0.00000E+00 | 9.85498E+00 |
| $a_4$ | 0.00000E+00 | 0.00000E+00 | -8.91041E-03 | -3.09047E-03 | 6.65312E-02 | 6.55556E-02 |
| $a_6$ | 0.00000E+00 | 0.00000E+00 | 1.46280E-02 | 6.43432E-03 | -7.16072E-02 | -9.40465E-02 |
| $a_8$ | 0.00000E+00 | 0.00000E+00 | 6.33540E-03 | -1.85258E-02 | 1.74767E-02 | 3.16479E-02 |
| $a_{10}$ | 0.00000E+00 | 0.00000E+00 | -8.47391E-03 | -9.53022E-03 | 1.75710E-03 | 4.11599E-03 |
| $a_{12}$ | 0.00000E+00 | 0.00000E+00 | -4.49354E-03 | 2.75274E-03 | 1.44122E-03 | -3.10473E-03 |
| $a_{14}$ | 0.00000E+00 | 0.00000E+00 | 0.00000E+00 | 0.00000E+00 | 0.00000E+00 | 0.00000E+00 |
| $a_{16}$ | 0.00000E+00 | 0.00000E+00 | 0.00000E+00 | 0.00000E+00 | 0.00000E+00 | 0.00000E+00 |
| Surface # | 241 | 242 | 251 | 252 | 261 | 262 |
| K | 0.00000E+00 | -4.02188E+00 | 0.00000E+00 | 0.00000E+00 | 0.00000E+00 | -8.58247E+00 |
| $a_4$ | 1.86854E-02 | -6.38747E-02 | 3.66457E-03 | 1.24284E-01 | -4.78454E-02 | -6.68736E-02 |
| $a_6$ | -6.56555E-02 | 9.42204E-03 | 6.49762E-03 | -3.28696E-02 | 1.45705E-02 | 2.18097E-02 |
| $a_8$ | 4.64274E-02 | 4.14253E-03 | -2.02940E-03 | 3.73852E-03 | 2.46788E-03 | -5.61542E-03 |
| $a_{10}$ | -7.57412E-03 | 2.05123E-03 | -5.20748E-03 | 1.33539E-04 | -1.06116E-03 | 6.43593E-04 |
| $a_{12}$ | -4.22522E-03 | 1.44603E-03 | 3.16466E-03 | 3.90197E-05 | 8.32516E-06 | 2.45647E-06 |
| $a_{14}$ | 5.82117E-04 | 9.69191E-05 | -5.92516E-04 | 3.26810E-05 | 2.53101E-05 | 5.62789E-06 |
| $a_{16}$ | -1.92121E-04 | -3.22912E-04 | 3.36819E-05 | 3.86378E-06 | 2.16135E-06 | 2.96556E-07 |

FIG. 9

| | f(Focus)=4.176 mm, HFOV(Half angular field of view)= 37.151deg., System length=4.516mm, Fno= 2.016, Image height=3.085mm |
|---|---|---|---|---|---|---|---|
| Surface # | | Radius | Thickness | Refractive index | Abbe number | Focus | Material |
| - | Object | ∞ | ∞ | | | | |
| 311 | 1st lens element | 2.288 | 0.488 | 1.544 | 56.114 | 10.443 | plastic |
| 312 | | 3.535 | 0.137 | | | | |
| 300 | Aperture stop | ∞ | 0.020 | | | | |
| 321 | 2nd lens element | 2.401 | 0.647 | 1.544 | 56.114 | 4.136 | plastic |
| 322 | | -34.373 | 0.093 | | | | |
| 331 | 3rd lens element | -17.265 | 0.240 | 1.636 | 23.972 | -5.407 | plastic |
| 332 | | 4.354 | 0.432 | | | | |
| 341 | 4th lens element | -12.476 | 0.666 | 1.535 | 55.635 | 3.820 | plastic |
| 342 | | -1.792 | 0.095 | | | | |
| 351 | 5th lens element | -4.442 | 0.729 | 1.535 | 55.635 | 7.516 | plastic |
| 352 | | -2.234 | 0.097 | | | | |
| 361 | 6th lens element | -5.276 | 0.371 | 1.535 | 55.635 | -2.639 | plastic |
| 362 | | 1.981 | 0.500 | | | | |
| 371 | IR cut filter | ∞ | 0.300 | | | | |
| 372 | | ∞ | 0.486 | | | | |
| 380 | Image plane | ∞ | | | | | |

FIG. 12

| Aspherical parameters | | | | | | |
|---|---|---|---|---|---|---|
| Surface # | 311 | 312 | 321 | 322 | 331 | 332 |
| K | -2.12201E+00 | -3.33225E+01 | -5.20184E+00 | -3.97343E+01 | 0.00000E+00 | 1.05516E+01 |
| $a_4$ | 0.00000E+00 | 0.00000E+00 | -9.55888E-03 | -3.31860E-03 | 6.34841E-02 | 6.74626E-02 |
| $a_6$ | 0.00000E+00 | 0.00000E+00 | 1.64943E-02 | 2.90137E-03 | -7.35853E-02 | -9.06577E-02 |
| $a_8$ | 0.00000E+00 | 0.00000E+00 | 6.11068E-03 | -2.22513E-02 | 1.74044E-02 | 3.34302E-02 |
| $a_{10}$ | 0.00000E+00 | 0.00000E+00 | -9.30628E-03 | -1.11201E-02 | 1.88270E-03 | 4.48072E-03 |
| $a_{12}$ | 0.00000E+00 | 0.00000E+00 | -5.05782E-03 | 3.55519E-03 | 6.34205E-04 | -3.19647E-03 |
| $a_{14}$ | 0.00000E+00 | 0.00000E+00 | 0.00000E+00 | 0.00000E+00 | 0.00000E+00 | 0.00000E+00 |
| $a_{16}$ | 0.00000E+00 | 0.00000E+00 | 0.00000E+00 | 0.00000E+00 | 0.00000E+00 | 0.00000E+00 |
| Surface # | 341 | 342 | 351 | 352 | 361 | 362 |
| K | 0.00000E+00 | -4.58922E+00 | 0.00000E+00 | 0.00000E+00 | 0.00000E+00 | -9.62903E+00 |
| $a_4$ | 2.27741E-02 | -5.72270E-02 | -1.57123E-02 | 9.97321E-02 | -4.92598E-02 | -7.17044E-02 |
| $a_6$ | -6.51105E-02 | 1.00845E-02 | 4.95392E-03 | -2.79308E-02 | 1.45495E-02 | 2.25042E-02 |
| $a_8$ | 4.91069E-02 | 3.74823E-03 | -1.47415E-03 | 4.23839E-03 | 2.48902E-03 | -5.54676E-03 |
| $a_{10}$ | -9.21824E-03 | 1.77557E-03 | -4.95393E-03 | 5.19510E-06 | -1.05874E-03 | 6.45439E-04 |
| $a_{12}$ | -5.30503E-03 | 1.35161E-03 | 3.22191E-03 | 1.43213E-05 | 8.35215E-06 | 2.19986E-06 |
| $a_{14}$ | 4.09046E-04 | 8.33203E-05 | -5.90184E-04 | 3.34835E-05 | 2.52803E-05 | 5.69223E-06 |
| $a_{16}$ | 8.00682E-05 | -3.03346E-04 | 2.76796E-05 | 4.51172E-06 | -2.15708E-06 | 2.84663E-07 |

FIG. 13

| f(Focus)=4.277 mm, HFOV(Half angular field of view)= 35.618deg., System length=4.599mm, Fno= 2.054, Image height=3.085mm ||||||||
|---|---|---|---|---|---|---|---|
| Surface # | | Radius | Thickness | Refractive index | Abbe number | Focus | Material |
| - | Object | ∞ | ∞ | | | | |
| 411 | 1st lens element | 2.352 | 0.423 | 1.544 | 56.114 | 10.755 | plastic |
| 412 | | 3.674 | 0.224 | | | | |
| 400 | Aperture stop | ∞ | 0.023 | | | | |
| 421 | 2nd lens element | 3.453 | 0.482 | 1.544 | 56.114 | 4.856 | plastic |
| 422 | | -10.850 | 0.269 | | | | |
| 431 | 3rd lens element | -24.785 | 0.240 | 1.636 | 23.972 | -6.175 | plastic |
| 432 | | 4.722 | 0.528 | | | | |
| 441 | 4th lens element | -940.746 | 0.381 | 1.535 | 55.635 | 5.441 | plastic |
| 442 | | -2.909 | 0.051 | | | | |
| 451 | 5th lens element | -3.917 | 0.377 | 1.535 | 55.635 | 12.809 | plastic |
| 452 | | -2.578 | 0.761 | | | | |
| 461 | 6th lens element | -2.690 | 0.340 | 1.535 | 55.635 | -4.281 | plastic |
| 462 | | 16.358 | 0.500 | | | | |
| 471 | IR cut filter | ∞ | 0.300 | | | | |
| 472 | | ∞ | 0.393 | | | | |
| 480 | Image plane | ∞ | | | | | |

FIG. 16

| Aspherical parameters | | | | | | |
|---|---|---|---|---|---|---|
| Surface # | 411 | 412 | 421 | 422 | 431 | 432 |
| K | -5.11938E+00 | -3.83466E+01 | -1.57736E+01 | -2.60747E+02 | 0.00000E+00 | 1.11330E+01 |
| $a_4$ | 0.00000E+00 | 0.00000E+00 | 1.23274E-02 | -3.40746E-03 | 5.50448E-02 | 1.23181E-02 |
| $a_6$ | 0.00000E+00 | 0.00000E+00 | 1.68299E-02 | 1.84945E-02 | -8.75809E-02 | -7.48375E-02 |
| $a_8$ | 0.00000E+00 | 0.00000E+00 | -6.43897E-03 | -1.77079E-02 | 4.62750E-02 | 2.76493E-02 |
| $a_{10}$ | 0.00000E+00 | 0.00000E+00 | -8.10367E-04 | -3.46342E-03 | -4.10102E-03 | 2.26038E-04 |
| $a_{12}$ | 0.00000E+00 | 0.00000E+00 | -5.90377E-03 | -2.42173E-03 | -1.37242E-03 | -1.69337E-03 |
| $a_{14}$ | 0.00000E+00 | 0.00000E+00 | 0.00000E+00 | 0.00000E+00 | 0.00000E+00 | 0.00000E+00 |
| $a_{16}$ | 0.00000E+00 | 0.00000E+00 | 0.00000E+00 | 0.00000E+00 | 0.00000E+00 | 0.00000E+00 |
| Surface # | 441 | 442 | 451 | 452 | 461 | 462 |
| K | 0.00000E+00 | -2.30606E+00 | 0.00000E+00 | 0.00000E+00 | 0.00000E+00 | -1.07574E+01 |
| $a_4$ | -3.50111E-03 | 2.21009E-02 | 3.33794E-02 | 6.30223E-03 | -4.22002E-02 | -5.04456E-02 |
| $a_6$ | -3.95998E-02 | -2.05540E-02 | 3.17516E-03 | 4.89941E-02 | 2.72702E-02 | 1.74421E-02 |
| $a_8$ | 9.88265E-03 | 2.30942E-03 | -3.87712E-03 | -2.76001E-02 | -9.73914E-04 | -4.12125E-03 |
| $a_{10}$ | 1.12300E-02 | 2.36478E-04 | -1.29910E-02 | 5.15915E-03 | -6.86532E-04 | 4.84970E-04 |
| $a_{12}$ | -1.10042E-02 | 2.63086E-05 | 6.89725E-03 | 2.85238E-04 | 3.77693E-05 | 1.04496E-06 |
| $a_{14}$ | 2.29776E-03 | 6.09210E-04 | -1.05337E-03 | -2.47155E-04 | 1.32668E-05 | 4.22430E-06 |
| $a_{16}$ | -9.15104E-04 | -1.58198E-04 | 1.04427E-04 | 3.58011E-05 | 1.30240E-06 | 1.47814E-07 |

FIG. 17

| f(Focus)=4.068 mm,HFOV(Half angular field of view)= 37.275deg., System length=4.447mm, Fno=2.007, Image height=3.085mm ||||||||
|---|---|---|---|---|---|---|---|
| Surface # | | Radius | Thickness | Refractive index | Abbe number | Focus | Material |
| - | Object | ∞ | ∞ | | | | |
| 511 | 1st lens element | 2.525 | 0.401 | 1.544 | 56.114 | 81.643 | plastic |
| 512 | | 2.526 | 0.178 | | | | |
| 500 | Aperture stop | ∞ | -0.088 | | | | |
| 521 | 2nd lens element | 1.841 | 0.716 | 1.544 | 56.114 | 3.191 | plastic |
| 522 | | -27.996 | 0.097 | | | | |
| 531 | 3rd lens element | -23.696 | 0.240 | 1.636 | 23.972 | -6.165 | plastic |
| 532 | | 4.755 | 0.573 | | | | |
| 541 | 4th lens element | -5.410 | 0.683 | 1.535 | 55.635 | 3.734 | plastic |
| 542 | | -1.526 | 0.098 | | | | |
| 551 | 5th lens element | -5.115 | 0.492 | 1.535 | 55.635 | 7.298 | plastic |
| 552 | | -2.292 | 0.103 | | | | |
| 561 | 6th lens element | -9.884 | 0.454 | 1.535 | 55.635 | -2.463 | plastic |
| 562 | | 1.549 | 0.500 | | | | |
| 571 | IR cut filter | ∞ | 0.300 | | | | |
| 572 | | ∞ | 0.553 | | | | |
| 580 | Image plane | ∞ | | | | | |

FIG. 20

| Aspherical parameters | | | | | | |
|---|---|---|---|---|---|---|
| Surface # | 511 | 512 | 521 | 522 | 531 | 532 |
| K | -2.69551E+00 | -1.18525E+01 | -3.46930E+00 | 3.33857E+02 | 0.00000E+00 | 1.19564E+01 |
| $a_4$ | 0.00000E+00 | 0.00000E+00 | -2.60989E-03 | -9.20708E-03 | 5.82332E-02 | 8.20020E-02 |
| $a_6$ | 0.00000E+00 | 0.00000E+00 | 1.56709E-02 | -1.30286E-03 | -7.16556E-02 | -8.71500E-02 |
| $a_8$ | 0.00000E+00 | 0.00000E+00 | 4.23162E-03 | -1.65966E-02 | 1.51927E-02 | 3.30374E-02 |
| $a_{10}$ | 0.00000E+00 | 0.00000E+00 | -9.99587E-03 | -8.33355E-03 | 1.32108E-03 | 3.66440E-03 |
| $a_{12}$ | 0.00000E+00 | 0.00000E+00 | -3.79622E-03 | 2.66873E-03 | 2.47611E-03 | -3.63432E-03 |
| $a_{14}$ | 0.00000E+00 | 0.00000E+00 | 0.00000E+00 | 0.00000E+00 | 0.00000E+00 | 0.00000E+00 |
| $a_{16}$ | 0.00000E+00 | 0.00000E+00 | 0.00000E+00 | 0.00000E+00 | 0.00000E+00 | 0.00000E+00 |
| Surface # | 541 | 542 | 551 | 552 | 561 | 562 |
| K | 0.00000E+00 | -3.77902E+00 | 0.00000E+00 | 0.00000E+00 | 0.00000E+00 | -7.27863E+00 |
| $a_4$ | 1.71342E-02 | -6.16835E-02 | 1.13201E-02 | 1.22356E-01 | -5.52631E-02 | -6.89404E-02 |
| $a_6$ | -7.00270E-02 | 2.79630E-03 | 5.03830E-03 | -3.25472E-02 | 1.50816E-02 | 2.24662E-02 |
| $a_8$ | 5.01266E-02 | 2.78366E-03 | -2.36979E-03 | 3.81187E-03 | 2.55304E-03 | -5.57635E-03 |
| $a_{10}$ | -6.43528E-03 | 2.43491E-03 | -5.20880E-03 | 1.45007E-04 | -1.06140E-03 | 6.36463E-04 |
| $a_{12}$ | -3.36456E-03 | 1.69263E-03 | 3.18643E-03 | 4.13615E-05 | 6.42369E-06 | 1.67017E-06 |
| $a_{14}$ | 8.41324E-04 | 1.59555E-04 | -5.88683E-04 | 3.25435E-05 | 2.50112E-05 | 5.62667E-06 |
| $a_{16}$ | -5.66288E-04 | -3.26641E-04 | 3.11890E-05 | 3.61100E-06 | 2.13368E-06 | 2.93512E-07 |

FIG. 21

| \multicolumn{8}{c}{f(Focus)=4.061 mm, HPOV(Half angular field of view)= 37.349deg., System length=4.456mm, Fno= 2.008, Image height=3.085mm} |||||||| 
|---|---|---|---|---|---|---|---|
| Surface # | | Radius | Thickness | Refractive index | Abbe number | Focus | Material |
| - | Object | ∞ | ∞ | | | | |
| 611 | 1st lens element | 2.496 | 0.390 | 1.544 | 56.114 | 86.088 | plastic |
| 612 | | 2.490 | 0.196 | | | | |
| 600 | Aperture stop | ∞ | -0.072 | | | | |
| 621 | 2nd lens element | 1.826 | 0.698 | 1.544 | 56.114 | 3.168 | plastic |
| 622 | | -28.360 | 0.097 | | | | |
| 631 | 3rd lens element | -23.759 | 0.240 | 1.636 | 23.972 | -6.220 | plastic |
| 632 | | 4.803 | 0.570 | | | | |
| 641 | 4th lens element | -5.184 | 0.632 | 1.535 | 55.635 | 4.098 | plastic |
| 642 | | -1.609 | 0.089 | | | | |
| 651 | 5th lens element | -4.691 | 0.430 | 1.535 | 55.635 | 7.812 | plastic |
| 652 | | -2.284 | 0.091 | | | | |
| 661 | 6th lens element | -11.393 | 0.594 | 1.535 | 55.635 | -2.679 | plastic |
| 662 | | 1.674 | 0.500 | | | | |
| 671 | IR cut filter | ∞ | 0.300 | | | | |
| 672 | | ∞ | 0.545 | | | | |
| 680 | Image plane | ∞ | | | | | |

FIG. 24

| Aspherical parameters | | | | | | |
|---|---|---|---|---|---|---|
| Surface # | 611 | 612 | 621 | 622 | 631 | 632 |
| K | -2.83424E+00 | -1.19921E+01 | -3.37974E+00 | 3.40038E+02 | 0.00000E+00 | 1.18830E+01 |
| $a_4$ | 0.00000E+00 | 0.00000E+00 | -2.29651E-03 | -9.32165E-03 | 5.77002E-02 | 8.23887E-02 |
| $a_6$ | 0.00000E+00 | 0.00000E+00 | 1.53897E-02 | -1.62566E-03 | -7.09250E-02 | -8.85912E-02 |
| $a_8$ | 0.00000E+00 | 0.00000E+00 | 3.91213E-03 | -1.65254E-02 | 1.56458E-02 | 3.21761E-02 |
| $a_{10}$ | 0.00000E+00 | 0.00000E+00 | -1.03119E-02 | -8.37234E-03 | 1.55738E-03 | 3.72987E-03 |
| $a_{12}$ | 0.00000E+00 | 0.00000E+00 | -3.93830E-03 | 2.61195E-03 | 2.61125E-03 | -3.23337E-03 |
| $a_{14}$ | 0.00000E+00 | 0.00000E+00 | 0.00000E+00 | 0.00000E+00 | 0.00000E+00 | 0.00000E+00 |
| $a_{16}$ | 0.00000E+00 | 0.00000E+00 | 0.00000E+00 | 0.00000E+00 | 0.00000E+00 | 0.00000E+00 |
| Surface # | 641 | 642 | 651 | 652 | 661 | 662 |
| K | 0.00000E+00 | -3.60083E+00 | 0.00000E+00 | 0.00000E+00 | 0.00000E+00 | -7.21959E+00 |
| $a_4$ | 1.83091E-02 | -6.21806E-02 | 1.45099E-02 | 1.22438E-01 | -5.53686E-02 | -6.77933E-02 |
| $a_6$ | -7.11675E-02 | 3.71599E-03 | 5.03822E-03 | -3.24562E-02 | 1.50536E-02 | 2.23471E-02 |
| $a_8$ | 4.85494E-02 | 3.14121E-03 | -2.41661E-03 | 3.82687E-03 | 2.54864E-03 | -5.59725E-03 |
| $a_{10}$ | -6.71723E-03 | 2.51085E-03 | -5.22176E-03 | 1.47268E-04 | -1.06218E-03 | 6.34231E-04 |
| $a_{12}$ | -3.33124E-03 | 1.70082E-03 | 3.18296E-03 | 4.16409E-05 | 6.35242E-06 | 1.52709E-06 |
| $a_{14}$ | 7.98637E-04 | 1.55542E-04 | -5.90012E-04 | 3.24964E-05 | 2.50263E-05 | 5.62465E-06 |
| $a_{16}$ | -6.92841E-04 | -3.30912E-04 | 3.06806E-05 | 3.61375E-06 | 2.12339E-06 | 2.96116E-07 |

FIG. 25

| \multicolumn{7}{c}{f(Focus)=4.098 mm,HFOV(Half angular field of view)= 37.208deg., System length=4.498mm, Fno= 2.006, Image height=3.085mm} | | | | | | |
|---|---|---|---|---|---|---|
| Surface # | | Radius | Thickness | Refractive index | Abbe number | Focus | Material |
| - | Object | ∞ | ∞ | | | | |
| 711 | 1st lens element | 2.350 | 0.379 | 1.544 | 56.114 | 998500000 | plastic |
| 712 | | 2.216 | 0.218 | | | | |
| 700 | Aperture stop | ∞ | -0.062 | | | | |
| 721 | 2nd lens element | 1.956 | 0.673 | 1.544 | 56.114 | 3.348 | plastic |
| 722 | | -24.584 | 0.207 | | | | |
| 731 | 3rd lens element | -27.688 | 0.240 | 1.636 | 23.972 | -7.633 | plastic |
| 732 | | 5.955 | 0.352 | | | | |
| 741 | 4th lens element | -4.940 | 0.594 | 1.535 | 55.635 | 4.931 | plastic |
| 742 | | -1.795 | 0.314 | | | | |
| 751 | 5th lens element | -4.537 | 0.458 | 1.535 | 55.635 | 6.862 | plastic |
| 752 | | -2.104 | 0.180 | | | | |
| 761 | 6th lens element | -8.338 | 0.447 | 1.535 | 55.635 | -2.861 | plastic |
| 762 | | 1.915 | 0.500 | | | | |
| 771 | IR cut filter | ∞ | 0.300 | | | | |
| 772 | | ∞ | 0.503 | | | | |
| 780 | Image plane | ∞ | | | | | |

FIG. 28

| Aspherical parameters | | | | | | |
|---|---|---|---|---|---|---|
| Surface # | 711 | 712 | 721 | 722 | 731 | 732 |
| K | -3.53948E+00 | -9.21577E+00 | -3.25786E+00 | -2.49744E+03 | 0.00000E-00 | 1.76949E-01 |
| $a_4$ | 0.00000E+00 | 0.00000E+00 | -6.14321E-03 | -1.52783E-02 | 4.69297E-02 | 7.82710E-02 |
| $a_6$ | 0.00000E+00 | 0.00000E+00 | 1.30051E-02 | 6.62368E-03 | -7.58768E-02 | -1.00024E-01 |
| $a_8$ | 0.00000E+00 | 0.00000E+00 | 4.72303E-03 | -1.08136E-02 | 1.44794E-02 | 3.00507E-02 |
| $a_{10}$ | 0.00000E+00 | 0.00000E+00 | -8.34782E-03 | -9.28213E-03 | 2.00128E-03 | 2.48728E-03 |
| $a_{12}$ | 0.00000E+00 | 0.00000E+00 | -3.17386E-03 | 1.49268E-03 | 2.44084E-03 | -3.61897E-03 |
| $a_{14}$ | 0.00000E+00 | 0.00000E+00 | 0.00000E+00 | 0.00000E+00 | 0.00000E-00 | 0.00000E-00 |
| $a_{16}$ | 0.00000E+00 | 0.00000E+00 | 0.00000E+00 | 0.00000E+00 | 0.00000E-00 | 0.00000E-00 |
| Surface # | 741 | 742 | 751 | 752 | 761 | 762 |
| K | 0.00000E+00 | -4.34206E+00 | 0.00000E+00 | 0.00000E+00 | 0.00000E-00 | -8.56171E+00 |
| $a_4$ | 4.89437E-02 | -4.11848E-02 | 3.21726E-02 | 1.18425E-01 | -6.34192E-02 | -6.87691E-02 |
| $a_6$ | -5.22383E-02 | 3.73322E-03 | -1.44990E-02 | -3.16983E-02 | 1.54197E-02 | 2.17586E-02 |
| $a_8$ | 4.20092E-02 | 3.12343E-03 | -4.97410E-03 | 3.12912E-03 | 2.69814E-03 | -5.61087E-03 |
| $a_{10}$ | -8.92639E-03 | 3.16350E-03 | -4.55253E-03 | 3.92696E-05 | -1.04770E-03 | 6.41968E-04 |
| $a_{12}$ | -2.06655E-03 | 1.92221E-03 | 3.35827E-03 | 2.37726E-05 | 5.62505E-06 | 2.86150E-06 |
| $a_{14}$ | 1.32757E-03 | 9.36554E-05 | -7.06561E-04 | 2.53902E-05 | 2.46211E-05 | 5.53341E-06 |
| $a_{16}$ | -1.23348E-03 | -4.51760E-04 | -1.22682E-04 | 9.03591E-06 | -2.10591E-06 | 2.79526E-07 |

FIG. 29

| f(Focus)=4.133 mm, HFOV(Half angular field of view)= 36.899deg., System length=4.497mm, Fno= 2.007, Image height=3.085mm ||||||||
|---|---|---|---|---|---|---|---|
| Surface # | | Radius | Thickness | Refractive index | Abbe number | Focus | Material |
| - | Object | ∞ | ∞ | | | | |
| 811 | 1st lens element | 2.442 | 0.413 | 1.544 | 56.114 | 78800000 | plastic |
| 812 | | 2.297 | 0.211 | | | | |
| 800 | Aperture stop | ∞ | -0.104 | | | | |
| 821 | 2nd lens element | 1.775 | 0.663 | 1.544 | 56.114 | 3.058 | plastic |
| 822 | | -24.431 | 0.098 | | | | |
| 831 | 3rd lens element | -20.343 | 0.240 | 1.636 | 23.972 | -6.313 | plastic |
| 832 | | 5.067 | 0.553 | | | | |
| 841 | 4th lens element | -4.227 | 0.593 | 1.535 | 55.635 | 5.378 | plastic |
| 842 | | -1.798 | 0.091 | | | | |
| 851 | 5th lens element | -4.908 | 0.470 | 1.535 | 55.635 | 6.422 | plastic |
| 852 | | -2.091 | 0.328 | | | | |
| 861 | 6th lens element | -6.939 | 0.440 | 1.535 | 55.635 | -2.810 | plastic |
| 862 | | 1.968 | 0.500 | | | | |
| 871 | IR cut filter | ∞ | 0.300 | | | | |
| 872 | | ∞ | 0.503 | | | | |
| 880 | Image plane | ∞ | | | | | |

FIG. 32

| Aspherical parameters | | | | | | |
|---|---|---|---|---|---|---|
| Surface # | 811 | 812 | 821 | 822 | 831 | 832 |
| K | -2.28159E+00 | -1.12689E+01 | -4.05375E+00 | 1.76549E+02 | 0.00000E+00 | 1.43147E+01 |
| $a_4$ | 0.00000E+00 | 0.00000E+00 | -3.19465E-03 | -6.49187E-03 | 6.31660E-02 | 8.15957E-02 |
| $a_6$ | 0.00000E+00 | 0.00000E+00 | 1.52974E-02 | -5.21244E-03 | -6.94834E-02 | -8.89485E-02 |
| $a_8$ | 0.00000E+00 | 0.00000E+00 | 2.87157E-03 | -1.17966E-02 | 1.31156E-02 | 3.26917E-02 |
| $a_{10}$ | 0.00000E+00 | 0.00000E+00 | -1.00993E-02 | -6.39107E-03 | 1.12200E-03 | 2.15043E-03 |
| $a_{12}$ | 0.00000E+00 | 0.00000E+00 | -3.09323E-03 | 1.33273E-03 | 3.41790E-03 | -4.83714E-03 |
| $a_{14}$ | 0.00000E+00 | 0.00000E+00 | 0.00000E+00 | 0.00000E+00 | 0.00000E+00 | 0.00000E+00 |
| $a_{16}$ | 0.00000E+00 | 0.00000E+00 | 0.00000E+00 | 0.00000E+00 | 0.00000E+00 | 0.00000E+00 |
| Surface # | 841 | 842 | 851 | 852 | 861 | 862 |
| K | 0.00000E+00 | -2.89814E+00 | 0.00000E+00 | 0.00000E+00 | 0.00000E+00 | -8.52669E+00 |
| $a_4$ | -9.66455E-03 | -6.18878E-02 | 2.35426E-02 | 1.21821E-01 | -5.84074E-02 | -7.01202E-02 |
| $a_6$ | -5.04373E-02 | 3.64617E-03 | -1.93702E-04 | -3.09928E-02 | 1.56151E-02 | 2.29010E-02 |
| $a_8$ | 4.77007E-02 | 2.54125E-03 | -3.05004E-03 | 3.76484E-03 | 2.64792E-03 | -5.54011E-03 |
| $a_{10}$ | -6.94954E-03 | 2.49542E-03 | -5.39018E-03 | 1.30774E-04 | -1.05959E-03 | 6.28918E-04 |
| $a_{12}$ | -2.48931E-03 | 1.87074E-03 | 3.12021E-03 | 4.80172E-05 | 4.54712E-06 | 9.77802E-08 |
| $a_{14}$ | 9.84588E-04 | 2.53063E-04 | -5.86143E-04 | -2.90522E-05 | 2.46955E-05 | 5.69612E-06 |
| $a_{16}$ | -1.18636E-03 | -3.06957E-04 | 4.88873E-05 | 4.27008E-06 | 2.07319E-06 | 3.23672E-07 |

FIG. 33

| f(Focus)=4.145 mm, HFOV(Half angular field of view)= 37.241deg., System length=4.540mm, Fno= 1.806, Image height=3.151mm |||||||
|---|---|---|---|---|---|---|---|
| Surface # | | Radius | Thickness | Refractive index | Abbe number | Focus | Material |
| - | Object | ∞ | ∞ | | | | |
| 911 | 1st lens element | 2.249 | 0.518 | 1.544 | 56.114 | 12.376 | plastic |
| 912 | | 3.098 | 0.172 | | | | |
| 900 | Aperture stop | ∞ | -0.023 | | | | |
| 921 | 2nd lens element | 2.733 | 0.741 | 1.544 | 56.114 | 4.410 | plastic |
| 922 | | -18.272 | 0.096 | | | | |
| 931 | 3rd lens element | -25.757 | 0.245 | 1.636 | 23.972 | -5.996 | plastic |
| 932 | | 4.528 | 0.444 | | | | |
| 941 | 4th lens element | -13.945 | 0.775 | 1.535 | 55.635 | 3.853 | plastic |
| 942 | | -1.835 | 0.096 | | | | |
| 951 | 5th lens element | -5.936 | 0.443 | 1.535 | 55.635 | 8.792 | plastic |
| 952 | | -2.696 | 0.129 | | | | |
| 961 | 6th lens element | 41.351 | 0.405 | 1.535 | 55.635 | -2.943 | plastic |
| 962 | | 1.515 | 0.500 | | | | |
| 971 | IR cut filter | ∞ | 0.300 | | | | |
| 972 | | ∞ | 0.561 | | | | |
| 980 | Image plane | ∞ | | | | | |

FIG. 36

| Aspherical parameters | | | | | | |
|---|---|---|---|---|---|---|
| Surface # | 911 | 912 | 921 | 922 | 931 | 932 |
| K | -1.70746E+00 | -2.30560E+01 | -5.35354E+00 | -7.85314E+02 | 0.00000E+00 | 1.01151E+01 |
| $a_4$ | 0.00000E+00 | 0.00000E+00 | -2.01010E-02 | 3.06238E-03 | 4.98716E-02 | 5.28919E-02 |
| $a_6$ | 0.00000E+00 | 0.00000E+00 | 1.23216E-02 | 2.79698E-03 | -5.55817E-02 | -7.86005E-02 |
| $a_8$ | 0.00000E+00 | 0.00000E+00 | 8.62953E-03 | -1.17776E-02 | 7.90669E-03 | 2.70864E-02 |
| $a_{10}$ | 0.00000E+00 | 0.00000E+00 | -6.85994E-03 | -7.36188E-03 | -5.33097E-04 | 1.38891E-03 |
| $a_{12}$ | 0.00000E+00 | 0.00000E+00 | -1.32381E-03 | 2.00759E-03 | 1.50876E-03 | -2.21975E-03 |
| $a_{14}$ | 0.00000E+00 | 0.00000E+00 | 0.00000E+00 | 0.00000E+00 | 0.00000E+00 | 0.00000E+00 |
| $a_{16}$ | 0.00000E+00 | 0.00000E+00 | 0.00000E+00 | 0.00000E+00 | 0.00000E+00 | 0.00000E+00 |
| Surface # | 941 | 942 | 951 | 952 | 961 | 962 |
| K | 0.00000E+00 | -3.78126E+00 | 0.00000E+00 | 0.00000E+00 | 0.00000E+00 | -6.66344E+00 |
| $a_4$ | 2.89521E-02 | -5.44395E-02 | 2.85515E-03 | 1.31904E-01 | -6.28425E-02 | -6.62320E-02 |
| $a_6$ | -6.42030E-02 | 2.63425E-03 | 5.53823E-03 | -3.69970E-02 | 1.25376E-02 | 1.99172E-02 |
| $a_8$ | 3.44699E-02 | 1.03144E-03 | -2.92402E-04 | 3.39915E-03 | 2.18623E-03 | -5.30197E-03 |
| $a_{10}$ | -4.79733E-03 | 1.30313E-03 | -4.93277E-03 | 1.39827E-04 | -8.01172E-04 | 6.53061E-04 |
| $a_{12}$ | -1.07763E-03 | 1.11463E-03 | 2.23951E-03 | 3.42758E-05 | 3.93711E-06 | 5.34993E-07 |
| $a_{14}$ | 1.04768E-03 | 1.89991E-04 | -3.16459E-04 | 2.52160E-05 | 2.03982E-05 | 5.01768E-06 |
| $a_{16}$ | -6.30427E-04 | -1.99244E-04 | 1.08751E-05 | 2.47924E-06 | -1.70491E-06 | 2.01662E-07 |

FIG. 37

| \multicolumn{7}{|c|}{f(Focus)=4.105 mm, HFOV(Half angular field of view)= 37.508deg., System length=4.582mm, Fno= 1.809, Image height=3.151mm} |
|---|---|---|---|---|---|---|---|
| Surface # | | Radius | Thickness | Refractive index | Abbe number | Focus | Material |
| - | Object | ∞ | ∞ | | | | |
| 1011 | 1st lens element | 2.165 | 0.539 | 1.544 | 56.114 | 9.591 | plastic |
| 1012 | | 3.366 | 0.146 | | | | |
| 1000 | Aperture stop | ∞ | 0.072 | | | | |
| 1021 | 2nd lens element | 2.980 | 0.552 | 1.544 | 56.114 | 4.534 | plastic |
| 1022 | | -13.649 | 0.091 | | | | |
| 1031 | 3rd lens element | -17.830 | 0.245 | 1.636 | 23.972 | -5.609 | plastic |
| 1032 | | 4.521 | 0.291 | | | | |
| 1041 | 4th lens element | -10.693 | 0.523 | 1.535 | 55.635 | 5.128 | plastic |
| 1042 | | -2.225 | 0.074 | | | | |
| 1051 | 5th lens element | -7.548 | 1.046 | 1.535 | 55.635 | 6.657 | plastic |
| 1052 | | -2.541 | 0.081 | | | | |
| 1061 | 6th lens element | 42.212 | 0.422 | 1.535 | 55.635 | -3.417 | plastic |
| 1062 | | 1.750 | 0.500 | | | | |
| 1071 | IR cut filter | ∞ | 0.300 | | | | |
| 1072 | | ∞ | 0.520 | | | | |
| 1080 | Image plane | ∞ | | | | | |

FIG. 40

| Aspherical parameters | | | | | | |
|---|---|---|---|---|---|---|
| Surface # | 1011 | 1012 | 1021 | 1022 | 1031 | 1032 |
| K | -1.35017E+00 | -3.42117E+01 | -9.20948E+00 | -4.63409E+02 | 0.00000E-00 | 1.07936E+01 |
| $a_4$ | 0.00000E+00 | 0.00000E+00 | -2.30662E-02 | 4.19763E-03 | 3.98115E-02 | 2.41132E-02 |
| $a_6$ | 0.00000E+00 | 0.00000E+00 | 1.48098E-02 | 5.68479E-03 | -5.72119E-02 | -9.32131E-02 |
| $a_8$ | 0.00000E+00 | 0.00000E+00 | 9.92431E-03 | -1.04307E-02 | 6.90404E-03 | 2.81692E-02 |
| $a_{10}$ | 0.00000E+00 | 0.00000E+00 | -7.59683E-03 | -8.43118E-03 | -3.66128E-04 | 3.27302E-03 |
| $a_{12}$ | 0.00000E+00 | 0.00000E+00 | -3.08455E-03 | -2.01629E-04 | 2.56895E-03 | -3.61801E-03 |
| $a_{14}$ | 0.00000E+00 | 0.00000E+00 | 0.00000E+00 | 0.00000E+00 | 0.00000E-00 | 0.00000E+00 |
| $a_{16}$ | 0.00000E+00 | 0.00000E+00 | 0.00000E+00 | 0.00000E+00 | 0.00000E-00 | 0.00000E+00 |
| Surface # | 1041 | 1042 | 1051 | 1052 | 1061 | 1062 |
| K | 0.00000E+00 | -5.84852E+00 | 0.00000E+00 | 0.00000E+00 | 0.00000E-00 | -8.23815E+00 |
| $a_4$ | 1.38490E-02 | -2.81587E-02 | 4.23793E-02 | 1.14435E-01 | -7.09924E-02 | -6.43191E-02 |
| $a_6$ | -4.37529E-02 | 1.26209E-02 | -1.53218E-02 | -3.12575E-02 | 1.23544E-02 | 1.88431E-02 |
| $a_8$ | 4.08759E-02 | 2.96428E-03 | -4.86113E-03 | 3.41266E-03 | 2.31357E-03 | -5.28058E-03 |
| $a_{10}$ | -7.10233E-03 | 1.52531E-03 | -3.19803E-03 | 3.88062E-05 | -7.72791E-04 | 6.69670E-04 |
| $a_{12}$ | -3.61667E-03 | 8.96489E-04 | 2.13641E-03 | 1.43031E-05 | 2.06832E-06 | 2.27541E-06 |
| $a_{14}$ | 2.18684E-04 | -4.43384E-05 | -7.31782E-04 | 2.32838E-05 | 2.00509E-05 | 5.09855E-06 |
| $a_{16}$ | -4.54095E-04 | -3.56075E-04 | 4.89486E-05 | 3.81086E-06 | 1.85877E-06 | 1.28395E-07 |

FIG. 41

| Embodiment | 1st Embodiment | 2nd Embodiment | 3rd Embodiment | 4th Embodiment | 5th Embodiment |
|---|---|---|---|---|---|
| TTL | 4.514 | 4.490 | 4.516 | 4.599 | 4.447 |
| ALT | 3.181 | 2.938 | 3.141 | 2.243 | 2.987 |
| Gaa | 1.333 | 1.551 | 1.374 | 2.356 | 1.460 |
| Gaa/G45 | 14.748 | 11.927 | 14.433 | 46.628 | 14.964 |
| ALT/G23 | 53.090 | 30.225 | 33.788 | 8.328 | 30.694 |
| Gaa/T5 | 2.970 | 3.591 | 1.885 | 6.242 | 2.967 |
| Gaa/T3 | 5.554 | 6.464 | 5.727 | 9.817 | 6.084 |
| ALT/T6 | 5.062 | 5.521 | 8.463 | 6.598 | 6.574 |
| TTL/T1 | 9.181 | 10.498 | 9.255 | 10.864 | 11.080 |
| ALT/G56 | 33.083 | 20.959 | 32.241 | 2.949 | 29.042 |
| Gaa/T2 | 1.883 | 2.277 | 2.125 | 4.892 | 2.040 |
| Gaa/T1 | 2.711 | 3.628 | 2.817 | 5.566 | 3.638 |

| Embodiment | 6th Embodiment | 7th Embodiment | 8th Embodiment | 9th Embodiment | 10th Embodiment |
|---|---|---|---|---|---|
| TTL | 4.456 | 4.498 | 4.497 | 4.540 | 4.582 |
| ALT | 2.984 | 2.789 | 2.819 | 3.127 | 3.327 |
| Gaa | 1.472 | 1.709 | 1.678 | 1.414 | 1.255 |
| Gaa/G45 | 16.536 | 5.448 | 18.353 | 14.706 | 16.851 |
| ALT/G23 | 30.807 | 13.478 | 28.866 | 32.663 | 36.654 |
| Gaa/T5 | 3.424 | 3.735 | 3.567 | 3.193 | 1.199 |
| Gaa/T3 | 6.134 | 7.120 | 6.990 | 5.770 | 5.122 |
| ALT/T6 | 5.021 | 6.246 | 6.407 | 7.711 | 7.882 |
| TTL/T1 | 11.416 | 11.874 | 10.900 | 8.768 | 8.508 |
| ALT/G56 | 32.652 | 15.520 | 8.604 | 24.230 | 41.114 |
| Gaa/T2 | 2.110 | 2.540 | 2.530 | 1.909 | 2.273 |
| Gaa/T1 | 3.771 | 4.511 | 4.067 | 2.730 | 2.330 |

FIG. 42

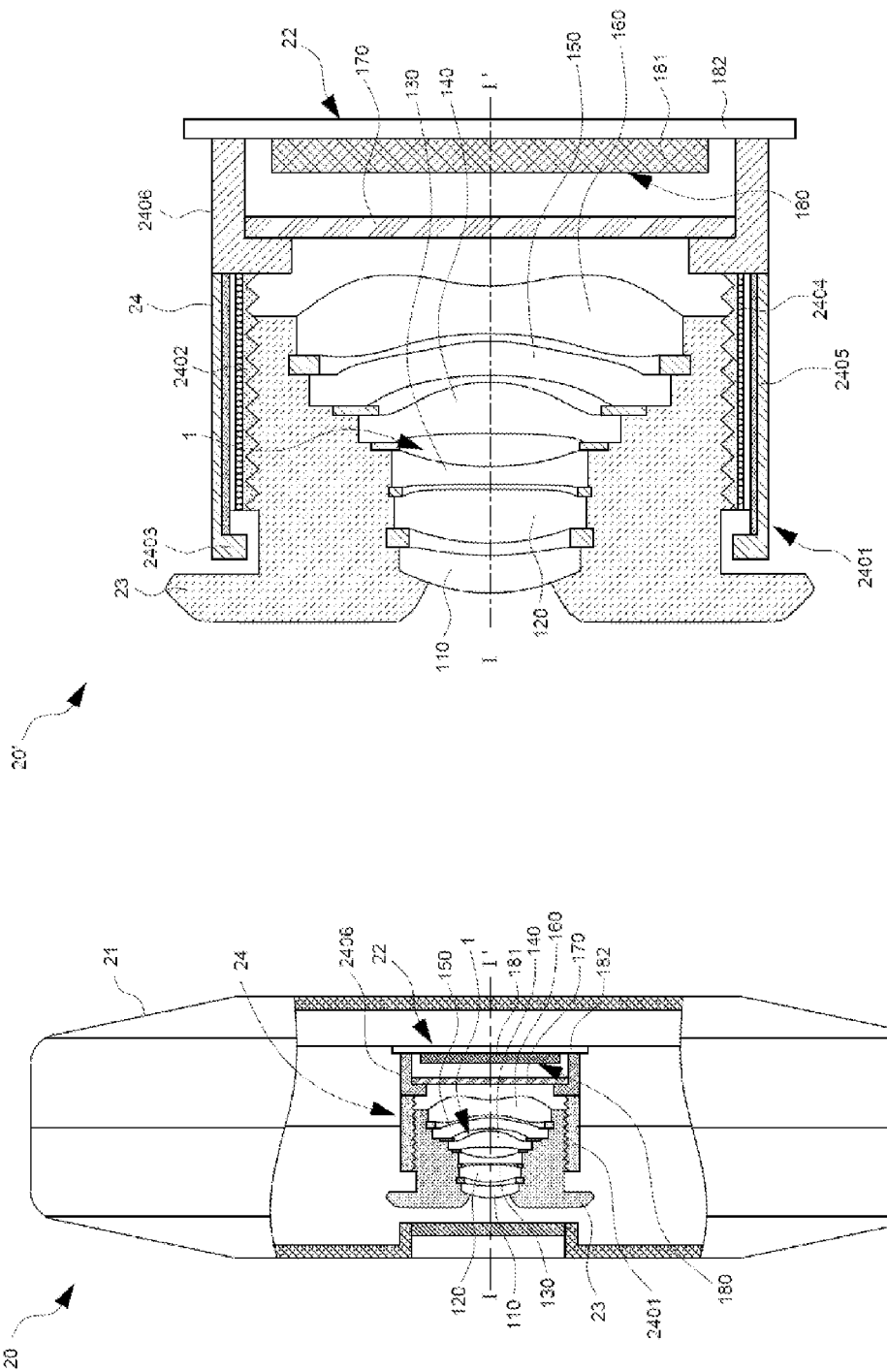

MOBILE DEVICE AND OPTICAL IMAGING LENS THEREOF

INCORPORATION BY REFERENCE

This application claims priority from China Patent Application No. 201310403008.8, filed on Sep. 6, 2013, the contents of which are hereby incorporated by reference in their entirety for all purposes.

TECHNICAL FIELD

The present invention relates to a mobile device and an optical imaging lens thereof, and particularly, relates to a mobile device applying an optical imaging lens having six lens elements and an optical imaging lens thereof.

BACKGROUND

The ever-increasing demand for smaller sized mobile devices, such as cell phones, digital cameras, etc. has correspondingly triggered a growing need for smaller sized photography modules comprising elements such as an optical imaging lens, a module housing unit, and an image sensor, etc., contained therein. Size reductions may be contributed from various aspects of the mobile devices, which includes not only the charge coupled device (CCD) and the complementary metal-oxide semiconductor (CMOS), but also the optical imaging lens mounted therein. When reducing the size of the optical imaging lens, however, achieving good optical characteristics becomes a challenging problem.

The length of conventional optical imaging lenses comprising four lens elements can be limited in a certain range; however, as the more and more demands in the market for high-end products, high-standard optical imaging lenses, such as the optical imaging lenses comprising six lens elements, which show great quality with more pixels are required.

U.S. Pat. No. 8,355,215 disclosed an optical imaging lens constructed with an optical imaging lens having six lens elements. The length of the optical imaging lens of patent '215, which, from the object-side surface of the first lens element to the image plane, is about 2 cm. Although the image quality of the optical imaging lens is acceptable, the volume of the optical imaging lens is too large to be suitable for small sized electronic device with the size between 1 cm and 2 cm.

Additionally, U.S. Pat. No. 8,432,619 disclosed an optical imaging lens constructed with an optical imaging lens having six lens elements. Although, the length of the optical imaging lens is reduced to 0.5 cm, which meets the demand of small sized product design, the image distortion of the optical imaging lens of patent '619 reaches 25%, and which means the image quality is too poor to meet specification requirements of consumer electronic products.

Therefore, there is needed to develop an optical imaging lens having six lens elements for high specification products.

SUMMARY

An object of the present invention is to provide a mobile device and an optical imaging lens thereof. With controlling the convex or concave shape of the surfaces of the lens elements, the length of the optical imaging lens is shortened and meanwhile the good optical characteristics, such as high resolution, are sustained.

In an exemplary embodiment, an optical imaging lens, sequentially from an object side to an image side, comprises first, second, third, fourth, fifth and sixth lens elements, each of said lens elements having an object-side surface facing toward the object side and an image-side surface facing toward the image side, in which the first lens element has a positive refractive power; the object-side surface of the second lens element comprises a convex portion in a vicinity of the optical axis; the object-side surface of the third lens element comprises a concave portion in a vicinity of the optical axis, and the image-side surface of the third lens element comprises a concave portion in a vicinity of the optical axis; the image-side surface of the fourth lens element comprises a convex portion in a vicinity of the optical axis; the image-side surface of the sixth lens element comprises a concave portion in a vicinity of the optical axis and a convex portion in a vicinity of a periphery of the sixth lens element; and the optical imaging lens as a whole comprises only the six lens elements having refractive power.

In an exemplary embodiment, some equation(s), such as those relating to the ratio among parameters could be taken into consideration. For example, the sum of all five air gaps from the first lens element to the sixth lens element along the optical axis, Gaa, and an air gap between the fourth lens element and the fifth lens element along the optical axis, G45, could be controlled to satisfy the equation as follows:

$$(Gaa/G45) \leq 21.0 \qquad \text{Equation (1)}.$$

In another exemplary embodiment, the sum of the thickness of all six lens elements along the optical axis, ALT, and an air gap between the second lens element and the third lens element along the optical axis, G23, could be controlled to satisfy the equation as follows:

$$ALT/G23 \leq 55.0 \qquad \text{Equation (2)}.$$

In another exemplary embodiment, a central thickness of the fifth lens element along the optical axis, T5, and Gaa could be controlled to satisfy the equation as follows:

$$Gaa/T5 \leq 3.85 \qquad \text{Equation (3)}.$$

In another exemplary embodiment, a central thickness of the third lens element along the optical axis, T3, and Gaa could be controlled to satisfy the equation as follows:

$$Gaa/T3 \leq 6.5 \qquad \text{Equation (4)}.$$

In another exemplary embodiment, a central thickness of the sixth lens element along the optical axis, T6, and ALT could be controlled to satisfy the equation as follows:

$$ALT/T6 \leq 8.5 \qquad \text{Equation (5)}.$$

In another exemplary embodiment, a distance from the object-side surface of the first lens element to the image side of the optical imaging lens along the optical axis, i.e. the system length of the optical imaging lens, TTL, and a central thickness of the first lens element along the optical axis T1, could be controlled to satisfy the equation as follows:

$$TTL/T1 \leq 11.5 \qquad \text{Equation (6)}.$$

In another exemplary embodiment, an air gap between the fifth lens element and the sixth lens element along the optical axis, G56, and ALT could be controlled to satisfy the equation as follows:

$$ALT/G56 \leq 30.0 \qquad \text{Equation (7)}.$$

In another exemplary embodiment, a central thickness of the second lens element along the optical axis, T2, and Gaa could be controlled to satisfy the equation as follows:

$$Gaa/T2 \leq 5.5 \qquad \text{Equation (8)}.$$

In another exemplary embodiment, a central thickness of the first lens element along the optical axis, T1, and Gaa could be controlled to satisfy the equation as follows:

$$Gaa/T1 \leq 3.8 \qquad \text{Equation (9)}.$$

In another exemplary embodiment, T2 and T5 could be controlled to satisfy the equation as follows:

$$T2 > T5 \qquad \text{Equation (10)}.$$

Aforesaid exemplary embodiments are not limited and could be selectively incorporated in other embodiments described herein.

In another exemplary embodiment, a mobile device comprises a housing and a photography module. The photography module is positioned in the housing and comprises a lens barrel, an optical imaging lens, a module housing unit, and an image sensor. The optical image lens is positioned in the lens barrel. The module housing unit is configured to provide a space where the lens barrel is positioned. The image sensor is positioned at the image side of the optical imaging lens.

Through controlling the arrangement of the convex or concave shape of the surface of the lens element(s) and/or refractive power, the mobile device and the optical imaging lens thereof in aforesaid exemplary embodiments achieve good optical characteristics and effectively shorten the lengths of the optical imaging lens.

BRIEF DESCRIPTION OF THE DRAWINGS

Exemplary embodiments will be more readily understood from the following detailed description when read in conjunction with the appended drawing, in which:

FIG. 4 is a table of optical data for each lens element of a first embodiment of the optical imaging lens of the present disclosures;

FIG. 5 is a table of aspherical data of a first embodiment of the optical imaging lens according to the present disclosures;

FIG. 8 is a table of optical data for each lens element of a second embodiment of the optical imaging lens of the present disclosures;

FIG. 9 is a table of aspherical data of a second embodiment of the optical imaging lens according to the present disclosures;

FIG. 12 is a table of optical data for each lens element of a third embodiment of the optical imaging lens according the present disclosures;

FIG. 13 is a table of aspherical data of a third embodiment of the optical imaging lens according the present disclosures;

FIG. 16 is a table of optical data for each lens element of a fourth embodiment of the optical imaging lens according the present disclosures;

FIG. 17 is a table of aspherical data of a fourth embodiment of the optical imaging lens according to the present disclosures;

FIG. 20 is a table of optical data for each lens element of a fifth embodiment of the optical imaging lens according the present disclosures;

FIG. 21 is a table of aspherical data of a fifth embodiment of the optical imaging lens according to the present disclosures;

FIG. 24 is a table of optical data for each lens element of a sixth embodiment of the optical imaging lens according the present disclosures;

FIG. 25 is a table of aspherical data of a sixth embodiment of the optical imaging lens according the present disclosures;

FIG. 28 is a table of optical data for each lens element of a seventh embodiment of the optical imaging lens according the present disclosures;

FIG. 29 is a table of aspherical data of a seventh embodiment of the optical imaging lens according the present disclosures;

FIG. 32 is a table of optical data for each lens element of an eighth embodiment of the optical imaging lens according the present disclosures;

FIG. 33 is a table of aspherical data of an eighth embodiment of the optical imaging lens according the present disclosures;

FIG. 36 is a table of optical data for each lens element of a ninth embodiment of the optical imaging lens according the present disclosures;

FIG. 37 is a table of aspherical data of a ninth embodiment of the optical imaging lens according the present disclosures;

FIG. 40 is a table of optical data for each lens element of a tenth embodiment of the optical imaging lens according the present disclosures;

FIG. 41 is a table of aspherical data of a tenth embodiment of the optical imaging lens according the present disclosures;

FIG. 42 is a table for the values of TTL, ALT, Gaa, Gaa/G45, ALT/G23, Gaa/T5, Gaa/T3, ALT/T6, ALT/G56, Gaa/T2, TTL/T1, and Gaa/T1 of all ten example embodiments;

FIG. 43 is a structure of an example embodiment of a mobile device; and

FIG. 44 is a partially enlarged view of the structure of another example embodiment of a mobile device.

DETAILED DESCRIPTION

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present invention. Furthermore, the terminology as used herein is for the purpose of describing example embodiments only and is not intended to be a limitation of the invention. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

Figure 1:
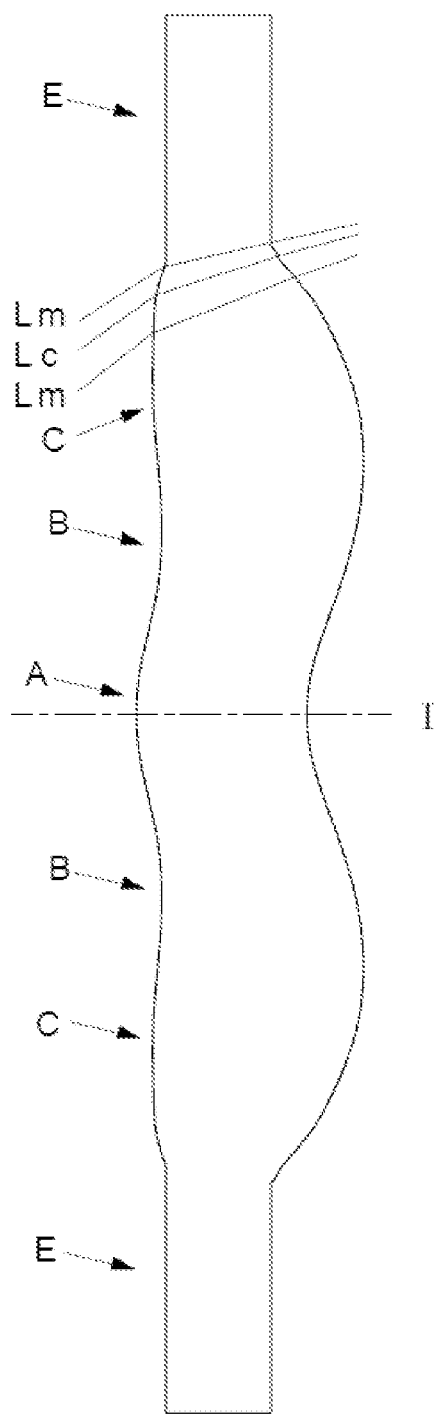
FIG. 1 is a cross-sectional view of one single lens element of one embodiment of an optical imaging lens according to the present disclosures.

Here in the present disclosures, the description "a lens element has a positive refractive power (or a negative refractive power)" means a portion of the lens has a positive refractive power (or a negative refractive power) in a vicinity of the optical axis. Furthermore, as used herein, the description "an object-side (or the image-side) surface of a lens element comprises a convex portion (or a concave portion) in a certain region" means the object-side (or image-side) surface of the lens element "protrudes outwardly (or depresses inwardly)" along the direction parallel to the optical axis at the specific region, compared with the outer region radially adjacent to the specific region. As shown in FIG. 1, the axis I represents the optical axis and the lens element is radially symmetric about the axis I. The object-side surface of the lens element comprises a convex portion at the region A, a concave portion at the region B, and another convex portion at the region C. This is because compared with the outer region radially adjacent to the region A (i.e. region B), the object-side surface protrudes outwardly at the region A, compared with the region C, the object-side surface depresses inwardly at the region B, and compared with the region E, the object-side surface protrudes outwardly at the region C. Here, "in a vicinity of a periphery of a lens element" means that in a vicinity of the peripheral region of a surface for passing imaging light on the lens element, i.e. the region C as shown in FIG. 1. The imaging light comprises chief ray Lc and marginal ray Lm. "In a vicinity of the optical axis" means that in a vicinity of the optical axis of a surface for passing the imaging light on the lens element, i.e. the region A as shown in FIG. 1. Further, a lens element could comprise an extending portion E for mounting the lens element in an optical imaging lens. Ideally, the imaging light would not pass the extending portion E. Here the extending portion E is only for example, the structure and shape thereof are not limited to this specific example. Please also noted that the extending portion of all the lens elements in the example embodiments shown below are skipped for maintaining the drawings clean and concise.

Example embodiments of an optical imaging lens may comprise a first lens element, an aperture stop, a second lens element, a third lens element, a fourth lens element, a fifth lens element, and a sixth lens element, in which each of the lens elements has refracting power, an object-side surface facing toward an object side and an image-side surface facing toward an image side. These lens elements may be arranged sequentially from the object side to the image side along an optical axis, and example embodiments of the lens as a whole may comprise only the six lens elements having refracting power. In an example embodiment: the first lens element has a positive refractive power; the object-side surface of the second lens element comprises a convex portion in a vicinity of the optical axis; the object-side surface of the third lens element comprises a concave portion in a vicinity of the optical axis, and the image-side surface of the third lens element comprises a concave portion in a vicinity of the optical axis; the image-side surface of the fourth lens element comprises a convex portion in a vicinity of the optical axis; and the image-side surface of the sixth lens element comprises a concave portion in a vicinity of the optical axis and a convex portion in a vicinity of a periphery of the sixth lens element.

Preferably, the lens elements in aforesaid exemplary embodiments are designed in light of the optical characteristics and the lengths of the optical imaging lens. For example, the first lens element having a positive refractive power may assist in collecting light for the system, and combining this with an aperture stop positioned between the first and second lens elements may reduce the length of the optical imaging lens and maintain good imaging quality. In conjunction with the above-mention design on the surfaces of the lens elements, the object-side surface of the second lens element comprising a convex portion in a vicinity of the optical axis, the object-side surface of the third lens element comprising a concave portion in a vicinity of the optical axis, the image-side surface of the third lens element comprising a concave portion in a vicinity of the optical axis, and the image-side surface of the fourth lens element comprising a convex portion in a vicinity of the optical axis may eliminate the aberration. Further, the image-side surface of the sixth lens element comprising a concave portion in a vicinity of the optical axis and a convex portion in a vicinity of a periphery of the sixth lens element may correct the field curvature of the optical imaging lens, reduce the high order aberration of the optical imaging lens, and depresses the angle of the chief ray (the incident angle of the light onto the image sensor), and then the sensitivity of the whole system is promoted to promote the image quality of the optical imaging lens.

In another exemplary embodiment, the ratio of related parameters of the optical imaging lens could be controlled to satisfy equations for assisting the designer to design the optical imaging lens with good optical characteristics and short total length under practicable technic, such as the sum of all five air gaps from the first lens element to the sixth lens element along the optical axis, Gaa, and an air gap between the fourth lens element and the fifth lens element along the optical axis, G45, could be controlled to satisfy the equation as follows:

$$(Gaa/G45) \leq 21.0 \qquad \text{Equation (1)}.$$

In another exemplary embodiment, the sum of the thickness of all six lens elements along the optical axis, ALT, and an air gap between the second lens element and the third lens element along the optical axis, G23, could be controlled to satisfy the equation as follows:

$$ALT/G23 \leq 55.0 \qquad \text{Equation (2)}.$$

In another exemplary embodiment, a central thickness of the fifth lens element along the optical axis, T5, and Gaa could be controlled to satisfy the equation as follows:

$$Gaa/T5 \leq 3.85 \qquad \text{Equation (3)}.$$

In another exemplary embodiment, a central thickness of the third lens element along the optical axis, T3, and Gaa could be controlled to satisfy the equation as follows:

$$Gaa/T3 \leq 6.5 \qquad \text{Equation (4)}.$$

In another exemplary embodiment, a central thickness of the sixth lens element along the optical axis, T6, and ALT could be controlled to satisfy the equation as follows:

$$ALT/T6 \leq 8.5 \qquad \text{Equation (5)}.$$

In another exemplary embodiment, a distance from the object-side surface of the first lens element to the image side of the optical imaging lens along the optical axis, i.e. the system length of the optical imaging lens, TTL, and a central thickness of the first lens element along the optical axis, T1, could be controlled to satisfy the equation as follows:

$$TTL/T1 \leq 11.5 \qquad \text{Equation (6)}.$$

In another exemplary embodiment, an air gap between the fifth lens element and the sixth lens element along the optical axis, G56, and ALT could be controlled to satisfy the equation as follows:

$$ALT/G56 \leq 30.0 \qquad \text{Equation (7)}.$$

In another exemplary embodiment, a central thickness of the second lens element along the optical axis, T2, and Gaa could be controlled to satisfy the equation as follows:

$$Gaa/T2 \leq 5.5 \qquad \text{Equation (8)}.$$

In another exemplary embodiment, a central thickness of the first lens element along the optical axis, T1, and Gaa could be controlled to satisfy the equation as follows:

$$Gaa/T1 \leq 3.8 \qquad \text{Equation (9)}.$$

In another exemplary embodiment, T2 and T5 could be controlled to satisfy the equation as follows:

$$T2 > T5 \qquad \text{Equation (10)}.$$

Aforesaid exemplary embodiments are not limited and could be selectively incorporated in other embodiments described herein.

Reference is now made to Equation (1). The shortened ratio of Gaa is greater than that of G45, which could effectively shorten the length of the optical imaging lens, and then could reduce the whole volume, such that which is favorable for endeavoring slimmer mobile devices. When Gaa/G45 meets to Equation (1), the optical imaging lens would have good optical characteristics. More preferably, the value of Gaa/G45 should be further restricted by a lower limit, for example but not limited to, the equation as follows:

$$5.0 \leq Gaa/G45 \leq 21.0 \qquad \text{Equation (1')}.$$

Reference is now made to Equation (2). The shortened ratio of G23 is smaller than that of ALT, and meanwhile the optical characteristics and the fabrication ability should be considered. Therefore, when ALT/G23 meets to Equation (2), the sum of the thickness of all six lens elements along the optical axis, ALT, and the air gap between the second lens element and the third lens element along the optical axis, G23, could be maintained in a proper range. More preferably, the value of ALT/G23 should be further restricted by a lower limit, for example but not limited to, the equation as follows:

$$8.0 \leq ALT/G23 \leq 55.0 \qquad \text{Equation (2')}.$$

Reference is now made to Equation (3). The shortened ratio of Gaa is greater than that of T5, which could effectively shorten the length of the optical imaging lens, and then could reduce the whole volume, such that which is favorable for endeavoring slimmer mobile devices. When Gaa/T5 meets to Equation (3), the optical imaging lens would have good optical characteristics. More preferably, the value of Gaa/T5 should be further restricted by a lower limit, for example but not limited to, the equation as follows:

$$1.0 \leq Gaa/T5 \leq 3.85 \qquad \text{Equation (3')}.$$

Reference is now made to Equation (4). The shortened ratio of Gaa is greater than that of T3, which could effectively shorten the length of the optical imaging lens, and then could reduce the whole volume, such that which is favorable for endeavoring slimmer mobile devices. When Gaa/T3 meets to Equation (4), the optical imaging lens would have good optical characteristics. More preferably, the value of Gaa/T3 should be further restricted by a lower limit, for example but not limited to, the equation as follows:

$$5.0 \leq Gaa/T3 \leq 6.5 \qquad \text{Equation (4')}.$$

Reference is now made to Equation (5). Generally, the shortened ratio of T6 is limited by the greater effective radius of the sixth lens element for passing imaging light. Therefore, the shorting ratio of ALT is greater than that of T6. When ALT/T6 meets to Equation (5), the optical imaging lens would have good optical characteristics. More preferably, the value of ALT/T6 should be further restricted by a lower limit, for example but not limited to, the equation as follows:

$$5.0 \leq ALT/T6 \leq 8.5 \qquad \text{Equation (5')}.$$

Reference is now made to Equation (6). Generally, the first lens element has to provide the positive refractive power of the optical imaging lens, such that the shortened ratio of T1 is smaller than that of TTL. When TTL/T1 meets to Equation (6), the optical imaging lens would have good optical characteristics. More preferably, the value of TTL/T1 should be further restricted by a lower limit, for example but not limited to, the equation as follows:

$$8.0 \leq TTL/T1 \leq 11.5 \qquad \text{Equation (6')}.$$

Reference is now made to Equation (7). The shortened ratio of G56 is smaller than that of ALT, and meanwhile the optical characteristics and the fabrication ability should be considered. Therefore, when ALT/G56 meets to Equation (7), the sum of the thickness of all six lens elements along the optical axis, ALT, and the air gap between the fifth lens element and the sixth lens element along the optical axis, G56, could be maintained in a proper range. More preferably, the value of ALT/G56 should be further restricted by a lower limit, for example but not limited to, the equation as follows:

$$2.5 \leq ALT/G56 \leq 30.0 \qquad \text{Equation (7')}.$$

Reference is now made to Equation (8). The shortened ratio of Gaa is greater than that of T2, which could effectively shorten the length of the optical imaging lens, and then could reduce the whole volume, such that which is favorable for endeavoring slimmer mobile devices. When Gaa/T2 meets to Equation (8), the optical imaging lens would have good optical characteristics. More preferably, the value of Gaa/T2 should be further restricted by a lower limit, for example but not limited to, the equation as follows:

$$1.5 \leq Gaa/T2 \leq 5.5 \qquad \text{Equation (8')}.$$

Reference is now made to Equation (9). Generally, the first lens element has to provide the positive refractive power of the optical imaging lens, such that the shortened ratio of T1 is smaller than that of Gaa. When Gaa/T1 meets to Equation (9), the optical imaging lens would have good optical characteristics. More preferably, the value of Gaa/T1 should be further restricted by a lower limit, for example but not limited to, the equation as follows:

$$2.0 \leq Gaa/T1 \leq 3.8 \qquad \text{Equation (9')}.$$

When T2 and T5 meet to Equation (10), the optical imaging lens would have good optical characteristics.

When implementing example embodiments, more details about the convex or concave surface structure and/or the refractive power may be incorporated for one specific lens element or broadly for plural lens elements to enhance the control for the system performance and/or resolution, as illustrated in the following embodiments. It is noted that the details listed here could be incorporated in example embodiments if no inconsistency occurs.

Figure 2:
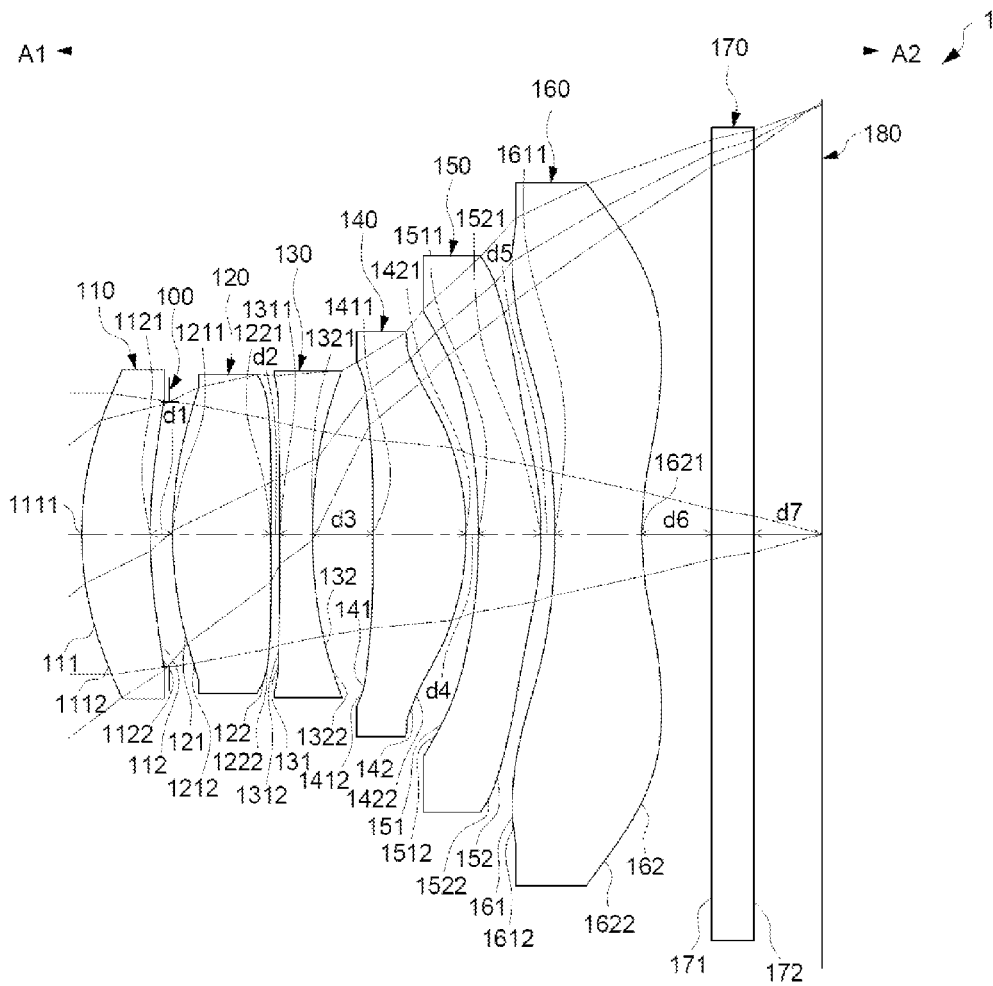
FIG. 2 is a cross-sectional view of a first embodiment of an optical imaging lens having six lens elements according to the present disclosures.
Figure 3:
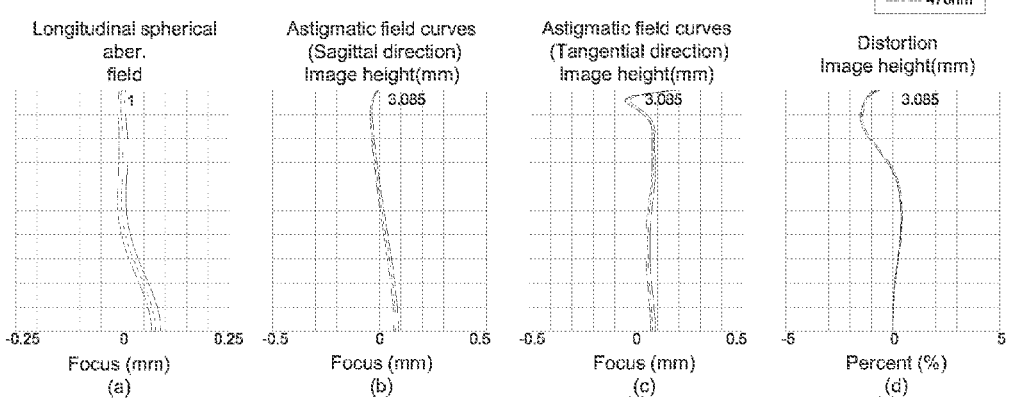
FIG. 3 is a chart of longitudinal spherical aberration and other kinds of optical aberrations of a first embodiment of the optical imaging lens according to the present disclosures.

Several exemplary embodiments and associated optical data will now be provided for illustrating example embodiments of optical imaging lens with good optical quality and a shortened length. Reference is now made to FIGS. 2-5. FIG. 2 illustrates a cross-sectional view of a first embodiment of the optical imaging lens 1 having six lens elements according to the present disclosures. FIGS. 3(a) to 3(d) show example charts of longitudinal spherical aberration and other kinds of optical aberrations of the optical imaging lens 1 according to an example embodiment. FIG. 4 illustrates an example table of optical data of each lens element of the optical imaging lens 1 according to an example embodiment. FIG. 5 depicts an example table of aspherical data of the optical imaging lens 1 according to an example embodiment.

As shown in FIG. 2, the optical imaging lens 1 of the present embodiment comprises, in order from an object side A1 to an image side A2, a first lens element 110, an aperture stop 100, a second lens element 120, a third lens element 130, a fourth lens element 140, a fifth lens element 150, and the sixth lens element 160. The aperture stop 100 may be also disposed between the first lens element 110 and the second element 120 or other position. A filtering unit 170 and an image plane 180 of an image sensor are positioned at the image side A2 of the optical image lens 1. More specifically, the filtering unit 170 is an IR cut filter (infrared cut filter) positioned between the sixth lens 160 and the image plane 180 of the image sensor. The filtering unit 170 selectively absorbs light with specific wavelength from the light passing optical imaging lens 1. For example, IR light is absorbed, and this will prohibit the IR light which is not seen by human eyes from producing an image on the image plane 180.

Exemplary embodiments of each lens elements of the optical imaging lens 1 will now be described with reference to the drawings. Each of the first, second, third, fourth, fifth, and sixth lens elements 110, 120, 130, 140, 150, 160 has an object-side surface 111/121/131/141/151/161 facing toward the object side A1 and an image-side surface 112/122/132/142/152/162 facing toward the image side A2. Both object-side surface 111/121/131/141/151/161 and image-side surface 112/122/132/142/152/162 may be aspherical surfaces.

An example embodiment of the first lens element 110 has a positive refractive power, which may be constructed by plastic material. The object-side surface 111 comprises a convex portion 1111 in a vicinity of the optical axis, and a convex portion 1112 in a vicinity of a periphery of the first lens element 110. The image-side surface 112 comprises a concave portion 1121 in a vicinity of the optical axis, and a concave portion 1122 in a vicinity of a periphery of the first lens element 110.

The second lens element 120 has a positive refractive power, which may be constructed by plastic material. The object-side surface 121 comprises a convex portion 1211 in a vicinity of the optical axis, and a convex portion 1212 in a vicinity of a periphery of the second lens element 120. The image-side surface 122 comprises a convex portion 1221 in a vicinity of the optical axis, and a convex portion 1222 in a vicinity of a periphery of the second lens element 120.

The third lens element 130 has a negative refractive power, which may be constructed by plastic material. The object-side surface 131 comprises a concave portion 1311 in a vicinity of the optical axis, and a concave portion 1312 in a vicinity of a periphery of the third lens element 130. The image-side surface 132 comprises a concave portion 1321 in a vicinity of the optical axis, and a concave portion 1322 in a vicinity of a periphery of the third lens element 130.

The fourth lens element 140 has a positive refractive power, which may be constructed by plastic material. The object-side surface 141 comprises a concave portion 1411 in a vicinity of the optical axis, and a concave portion 1412 in a vicinity of a periphery of the fourth lens element 140. The image-side surface 142 comprises a convex portion 1421 in a vicinity of the optical axis, and a convex portion 1422 in a vicinity of a periphery of the fourth lens element 140.

The fifth lens element 150 has a positive refractive power, which may be constructed by plastic material. The object-side surface 151 comprises a concave portion 1511 in a vicinity of the optical axis, and a concave portion 1512 in a vicinity of a periphery of the fifth lens element 150. The image-side surface 152 comprises a convex portion 1521 in a vicinity of the optical axis, and a convex portion 1522 in a vicinity of a periphery of the fifth lens element 150.

The sixth lens element 160 has a negative refractive power, which may be constructed by plastic material. The object-side surface 161 comprises a concave portion 1611 in a vicinity of the optical axis, and a convex portion 1612 in a vicinity of a periphery of the sixth lens element 160. The image-side surface 162 comprises a concave portion 1621 in a vicinity of the optical axis, and a convex portion 1622 in a vicinity of a periphery of the sixth lens element 160.

In example embodiments, air gaps exist between the lens elements 110-160, the filtering unit 170, and the image plane

180 of the image sensor. For example, FIG. 2 illustrates the air gap d1 existing between the first lens element 110 and the second lens element 120, the air gap d2 existing between the second lens element 120 and the third lens element 130, the air gap d3 existing between the third lens element 130 and the fourth lens element 140 the air gap d4 existing between the fourth lens element 140 and the fifth lens element 150, the air gap d5 existing between the fifth lens element 150 and the sixth lens element 160, the air gap d6 existing between the sixth lens element 160 and the filtering unit 170, and the air gap d7 existing between the filtering unit 170 and the image plane 180 of the image sensor. However, in other embodiments, any of the aforesaid air gaps may or may not exist. For example, the profiles of opposite surfaces of any two adjacent lens elements may correspond to each other, and in such situation, the air gaps may not exist. The air gap d1 is denoted by G12, the air gap d2 is denoted by G23, the air gaps d3 is denoted by G34, the air d4 gap is denoted by G45, the air gap d5 is denoted by G56, and the sum of all air gaps d1, d2, d3, d4, d5 between the first though sixth lens elements is denoted by Gaa.

FIG. 4 depicts the optical characteristics of each lens elements in the optical imaging lens 1 and thicknesses of the air gaps of the present embodiment, in which the values of Gaa/G45, ALT/G23, Gaa/T5, Gaa/T3, ALT/T6, ALT/G56, Gaa/T2, TTL/T1, and Gaa/T1 are:

Gaa/G45=14.748, satisfying Equation (1), and (1');
ALT/G23=53.090, satisfying Equation (2), and (2');
Gaa/T5=2.970, satisfying Equation (3), and (3');
Gaa/T3=5.554, satisfying Equation (4), and (4');
ALT/T6=5.062, satisfying Equation (5), and (5');
TTL/T1=9.181, satisfying Equation (6), and (6');
ALT/G56=33.083;
Gaa/T2=1.883, satisfying Equation (8), and (8'); and
Gaa/T1=2.711, satisfying Equation (9), and (9').

The system length of the optical imaging lens, TTL, i.e. the distance from the object-side surface 111 of the first lens element 110 to the image plane 180 along the optical axis is 4.514 mm, and the length of the optical imaging lens 1 is indeed shortened.

The aspherical surfaces, including the object-side surfaces 111, 121, 131, 141, 151, 161 and the image-side surfaces 112, 122, 132, 142, 152, 162 are all defined by the following aspherical formula:

$$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i}$$

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant; and $a_{2i}$ represents an aspherical coefficient of $2i^{th}$ order.

The values of each aspherical parameter, K, and $a_4$-$a_{16}$ of each lens element 110, 120, 130, 140 are represented in FIG. 5.

FIG. 3(a) illustrates the longitudinal spherical aberration of the present embodiment, in which curves of different wavelengths are distributed closely, that means the off-axis light with different height of different wavelengths converge in a vicinity of the imaging point. FIG. 3(a) shows that the offsets between the off-axis light with different light and the imaging point are controlled to be ±0.1 mm. Therefore, the present embodiment improves the spherical aberration in different wavelengths obviously. Additionally, the distances between the three represented wavelengths are quite close, that means the image positions of the different wavelengths converge with one another, such that the chromatic aberration is improved obviously.

FIG. 3(b) illustrates an astigmatism aberration in the sagittal direction of the present embodiment, and FIG. 3(c) illustrates an astigmatism aberration in the tangential direction of the present embodiment. The focal lengths of the three represented wavelengths in the whole field of view are within ±0.10 mm. Therefore, the optical imaging lens 1 of the present embodiment could eliminate the aberration effectively. Additionally, the distances between the three represented wavelengths are quite close, that means the aberration is improved obviously.

FIG. 3(d) illustrates a distortion aberration of the present embodiment. The distortion aberration of the present embodiment is maintained within the range of ±2%, that means the distortion aberration meets the image quality of optical system. Accordingly, the system length of the optical imaging lens 1 is shortened to be 5.00 mm approximately, which could overcome the chromatic aberration and provide better image quality. Therefore, the present embodiment achieves great optical performance and the length of the optical imaging lens 1 is effectively shortened.

Figure 6:
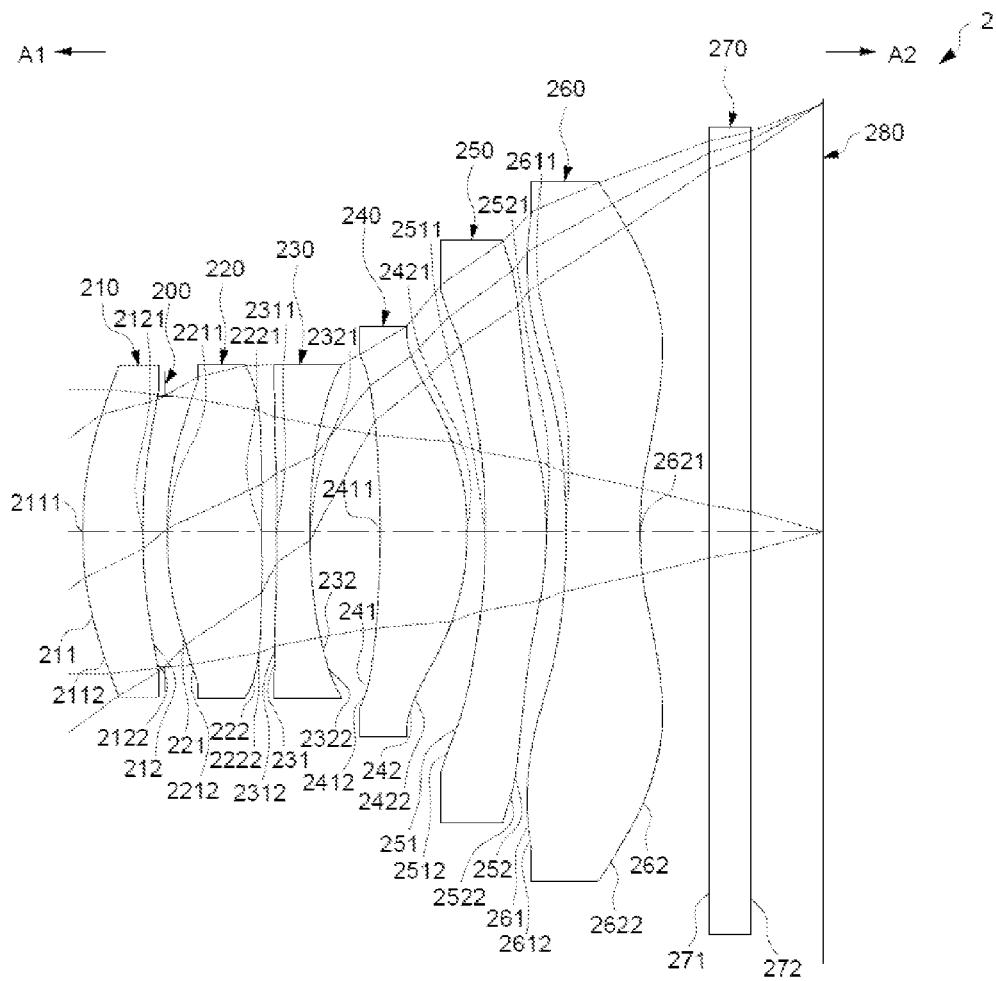
FIG. 6 is a cross-sectional view of a second embodiment of an optical imaging lens having six lens elements according to the present disclosures.
Figure 7:
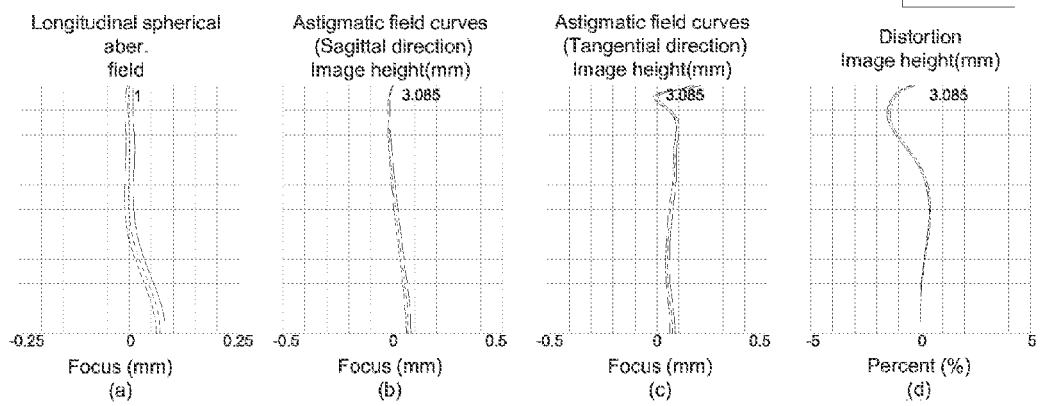
FIG. 7 is a chart of longitudinal spherical aberration and other kinds of optical aberrations of a second embodiment of the optical imaging lens according to the present disclosures.

Reference is now made to FIGS. 6-9. FIG. 6 illustrates an example cross-sectional view of an optical imaging lens 2 having six lens elements of the optical imaging lens according to a second example embodiment. FIG. 7 shows example charts of longitudinal spherical aberration and other kinds of optical aberrations of the optical imaging lens 2 according to the second example embodiment. FIG. 8 shows an example table of optical data of each lens element of the optical imaging lens 2 according to the second example embodiment. FIG. 9 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 6, the second embodiment is similar to the first embodiment. The optical imaging lens 2, in an order from an object side A1 to an image side A2, comprises an aperture stop 200, first lens element to sixth lens element 210-260. A filtering unit 270 and an image plane 280 of an image sensor are positioned at the image side A2 of the optical imaging lens 2. The arrangement of the convex or concave surface structures, including the object-side surfaces 211, 221, 231, 241, 251, 261 and image-side surfaces 212, 222, 232, 242, 252, 262 are generally same with the optical imaging lens 1. The difference between the optical imaging lens 1 and the optical imaging lens 2 is the radius of curvature, the values of the central thicknesses of the lens elements 210-260 and the air gaps between the lens elements 210-260 are slight different from the values of the optical imaging lens 1.

Please refer to FIG. 8 for the optical characteristics of each lens elements in the optical imaging lens 2 and thicknesses of the air gaps of the present embodiment, in which the values of Gaa/G45, ALT/G23, Gaa/T5, Gaa/T3, ALT/T6, ALT/G56, Gaa/T2, TTL/T1, and Gaa/T1 are:
  Gaa/G45=11.927, satisfying Equation (1), and (1');
  ALT/G23=30.225, satisfying Equation (2), and (2');
  Gaa/T5=3.591, satisfying Equation (3), and (3');
  Gaa/T3=6.464, satisfying Equation (4), and (4');
  ALT/T6=5.521, satisfying Equation (5), and (5');
  TTL/T1=10.498, satisfying Equation (6), and (6');
  ALT/G56=20.959, satisfying Equation (7), and (7');
  Gaa/T2=2.277, satisfying Equation (8), and (8'); and
  Gaa/T1=3.628, satisfying Equation (9), and (9').

The system length of the optical imaging lens, TTL, i.e. the distance from the object-side surface 211 of the first lens element 210 to the image plane 280 along the optical axis is 4.490 mm, and the length of the optical imaging lens 2 is indeed shortened.

As shown in FIGS. 7(a)-7(d), the optical imaging lens 2 of the present embodiment shows great characteristics in longitudinal spherical aberration 7(a), astigmatism in the sagittal direction 7(b), astigmatism in the tangential direction 7(c), and distortion aberration 7(d). Therefore, according to the above illustration, the optical imaging lens of the present embodiment indeed shows great optical performance and the length of the optical imaging lens 2 is effectively shortened.

Figure 10:
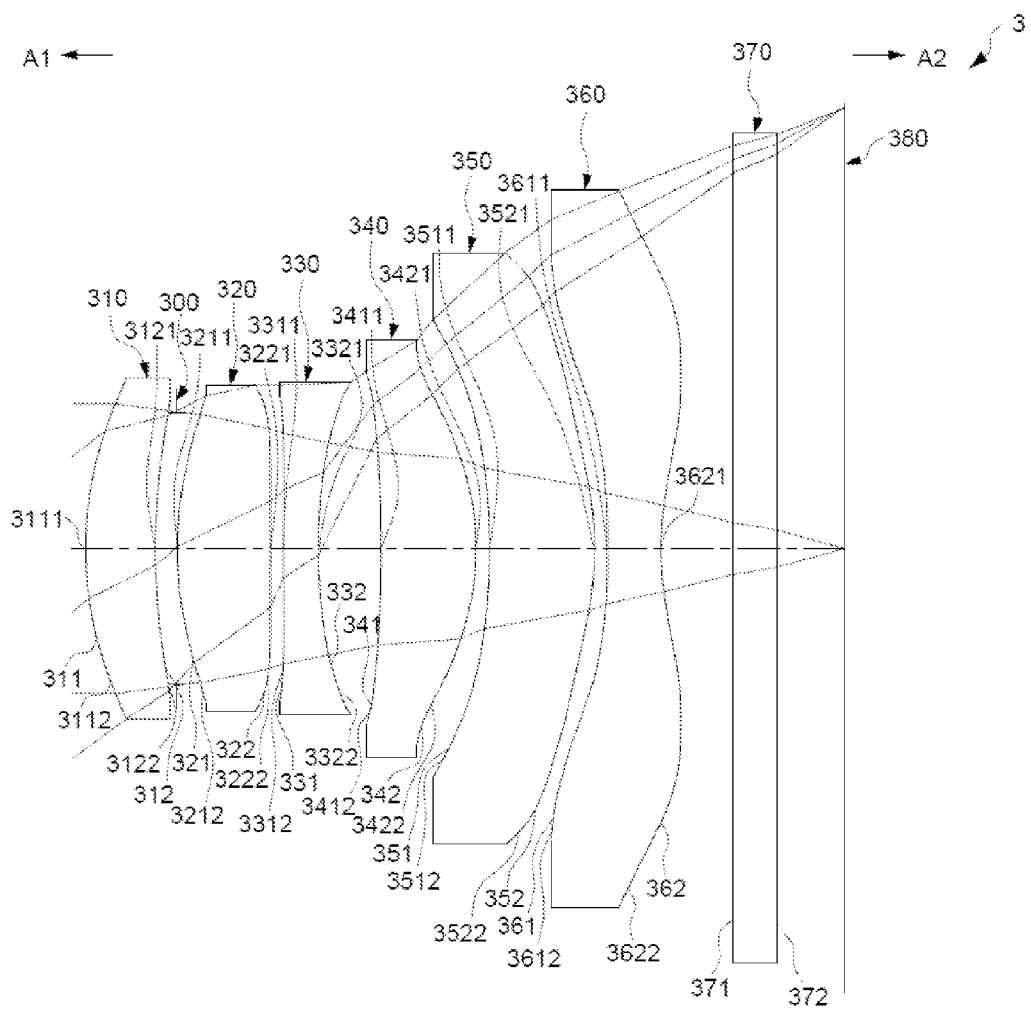
FIG. 10 is a cross-sectional view of a third embodiment of an optical imaging lens having six lens elements according to the present disclosures.
Figure 11:
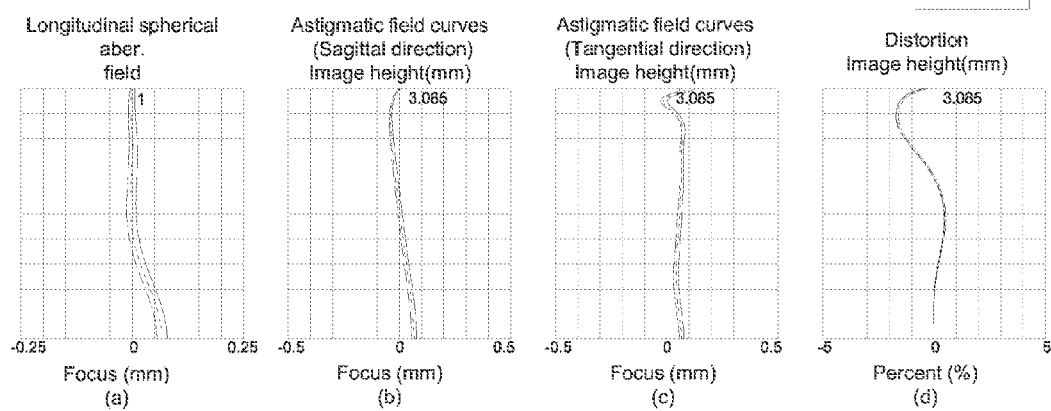
FIG. 11 is a chart of longitudinal spherical aberration and other kinds of optical aberrations of a third embodiment of the optical imaging lens according the present disclosures.

Reference is now made to FIGS. 10-13. FIG. 10 illustrates an example cross-sectional view of an optical imaging lens 3 having six lens elements of the optical imaging lens according to a third example embodiment. FIG. 11 shows example charts of longitudinal spherical aberration and other kinds of optical aberrations of the optical imaging lens 3 according to the third example embodiment. FIG. 12 shows an example table of optical data of each lens element of the optical imaging lens 3 according to the third example embodiment. FIG. 13 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 10, the third embodiment is similar to the first embodiment. The optical imaging lens 3, in an order from an object side A1 to an image side A2, comprises an aperture stop 300, first lens element to sixth lens element 310-360. A filtering unit 370 and an image plane 380 of an image sensor are positioned at the image side A2 of the optical imaging lens 3. The arrangement of the convex or concave surface structures, including the object-side surfaces 311, 321, 331, 341, 351, 361 and image-side surfaces 312, 322, 332, 342, 352, 362 are generally same with the optical imaging lens 1. The difference between the optical imaging lens 1 and the optical imaging lens 3 is the radius of curvature, the values of the central thicknesses of the lens elements 310-360 and the air gaps between the lens elements 310-360 are slight different from the values of the optical imaging lens 1.

Please refer to FIG. 12 for the optical characteristics of each lens elements in the optical imaging lens 3 and thicknesses of the air gaps of the present embodiment, in which the values of Gaa/G45, ALT/G23, Gaa/T5, Gaa/T3, ALT/T6, ALT/G56, Gaa/T2, TTL/T1, and Gaa/T1 are:
  Gaa/G45=14.433, satisfying Equation (1), and (1');
  ALT/G23=33.788, satisfying Equation (2), and (2');
  Gaa/T5=1.885, satisfying Equation (3), and (3');
  Gaa/T3=5.727, satisfying Equation (4), and (4');
  ALT/T6=8.463, satisfying Equation (5), and (5');
  TTL/T1=9.255, satisfying Equation (6), and (6');
  ALT/G56=32.241;
  Gaa/T2=2.125, satisfying Equation (8), and (8'); and
  Gaa/T1=2.817, satisfying Equation (9), and (9').

The system length of the optical imaging lens, TTL, i.e. the distance from the object-side surface 311 of the first lens element 310 to the image plane 380 along the optical axis is 4.516 mm, and the length of the optical imaging lens 3 is indeed shortened.

As shown in FIGS. 11(a)-11(d), the optical imaging lens 3 of the present embodiment shows great characteristics in longitudinal spherical aberration 11(a), astigmatism in the sagittal direction 11(b), astigmatism in the tangential direction 11(c), and distortion aberration 11(d). Therefore, according to the above illustration, the optical imaging lens of the present embodiment indeed shows great optical performance and the length of the optical imaging lens 3 is effectively shortened.

Figure 14:
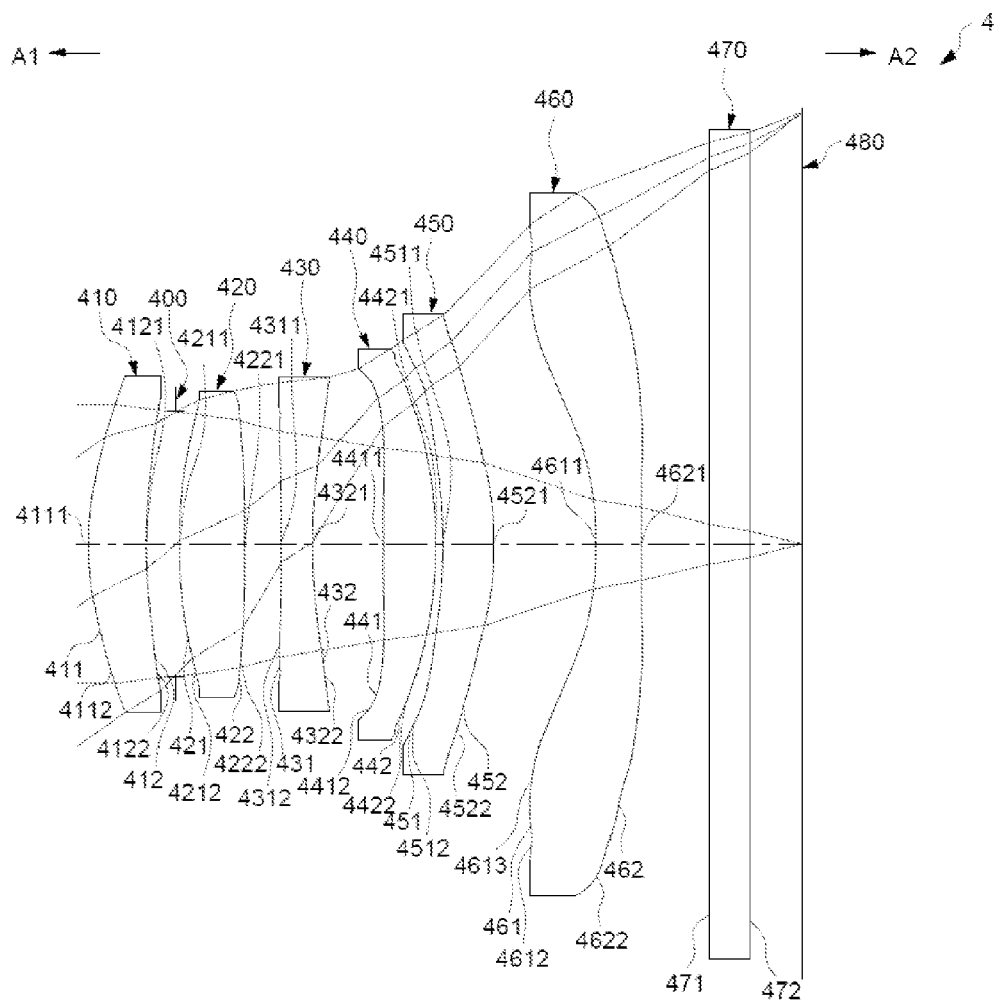
FIG. 14 is a cross-sectional view of a fourth embodiment of an optical imaging lens having six lens elements according to the present disclosures.
Figure 15:
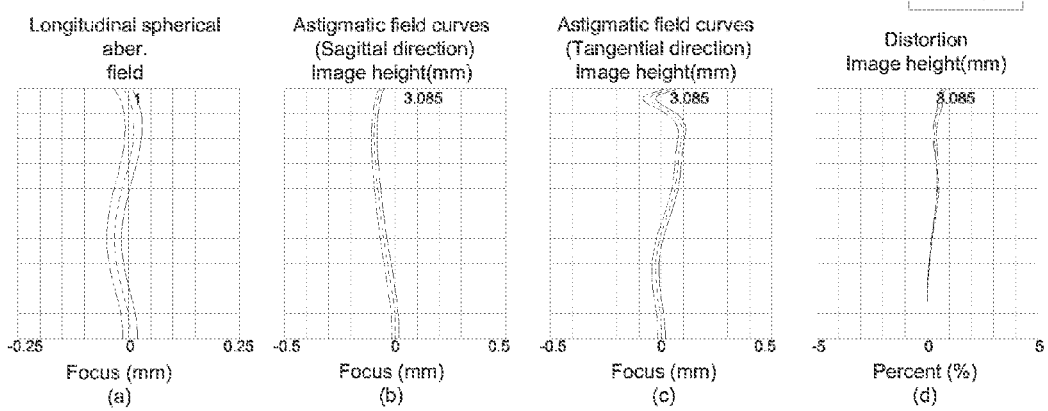
FIG. 15 is a chart of longitudinal spherical aberration and other kinds of optical aberrations of a fourth embodiment of the optical imaging lens according the present disclosures.

Reference is now made to FIGS. 14-17. FIG. 14 illustrates an example cross-sectional view of an optical imaging lens 4 having six lens elements of the optical imaging lens according to a fourth example embodiment. FIG. 15 shows example charts of longitudinal spherical aberration and other kinds of optical aberrations of the optical imaging lens 4 according to the fourth example embodiment. FIG. 16 shows an example table of optical data of each lens element of the optical imaging lens 4 according to the fourth example embodiment. FIG. 17 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 14, the fourth embodiment is similar to the first embodiment. The optical imaging lens 4, in an order from an object side A1 to an image side A2, comprises an aperture stop 400, first lens element to sixth lens element 410-460. A filtering unit 470 and an image plane 480 of an image sensor are positioned at the image side A2 of the optical imaging lens 4. The arrangement of the convex or concave surface structures, including the object-side surfaces 411, 421, 431, 441, 451 and image-side surfaces 412, 422, 432, 442, 452, 462 are generally same with the optical imaging lens 1. The difference between the optical imaging lens 1 and the optical imaging lens 4 is the radius of curvature, the values of the central thicknesses of the lens elements 410-460 and the air gaps between the lens elements 410-460 are slight different from the values of the optical imaging lens 1. Besides, the sixth lens element 460 is slight different from that in the first embodiment. More specifically, the object-side surface 461 of the sixth lens element 460 has a concave portion 4611 in a vicinity of the axis, a concave portion 4612 in a vicinity of a peripheral of the sixth lens element 460, and a convex portion 4613 in a vicinity between the optical axis and the peripheral of the sixth lens element 460.

Please refer to FIG. 16 for the optical characteristics of each lens elements in the optical imaging lens 4 and thicknesses of the air gaps of the present embodiment, in which the values of Gaa/G45, ALT/G2, Gaa/T5, Gaa/T3, ALT/T6, ALT/G56, Gaa/T2, TTL/T1, and Gaa/T1 are:
  Gaa/G45=46.628;
  ALT/G23=8.328, satisfying Equation (2), and (2');
  Gaa/T5=6.242;
  Gaa/T3=9.817;

ALT/T6=6.598, satisfying Equation (5), and (5');
TTL/T1=10.864, satisfying Equation (6), and (6');
ALT/G56=2.949, satisfying Equation (7), and (7');
Gaa/T2=4.892, satisfying Equation (8), and (8'); and
Gaa/T1=5.566.

The system length of the optical imaging lens, TTL, i.e. the distance from the object-side surface 411 of the first lens element 410 to the image plane 480 along the optical axis is 4.599 mm, and the length of the optical imaging lens 4 is indeed shortened.

As shown in FIGS. 15(a)-15(d), the optical imaging lens 4 of the present embodiment shows great characteristics in longitudinal spherical aberration 15(a), astigmatism in the sagittal direction 15(b), astigmatism in the tangential direction 15(c), and distortion aberration 15(d). Therefore, according to the above illustration, the optical imaging lens of the present embodiment indeed shows great optical performance and the length of the optical imaging lens 4 is effectively shortened.

Figure 18:
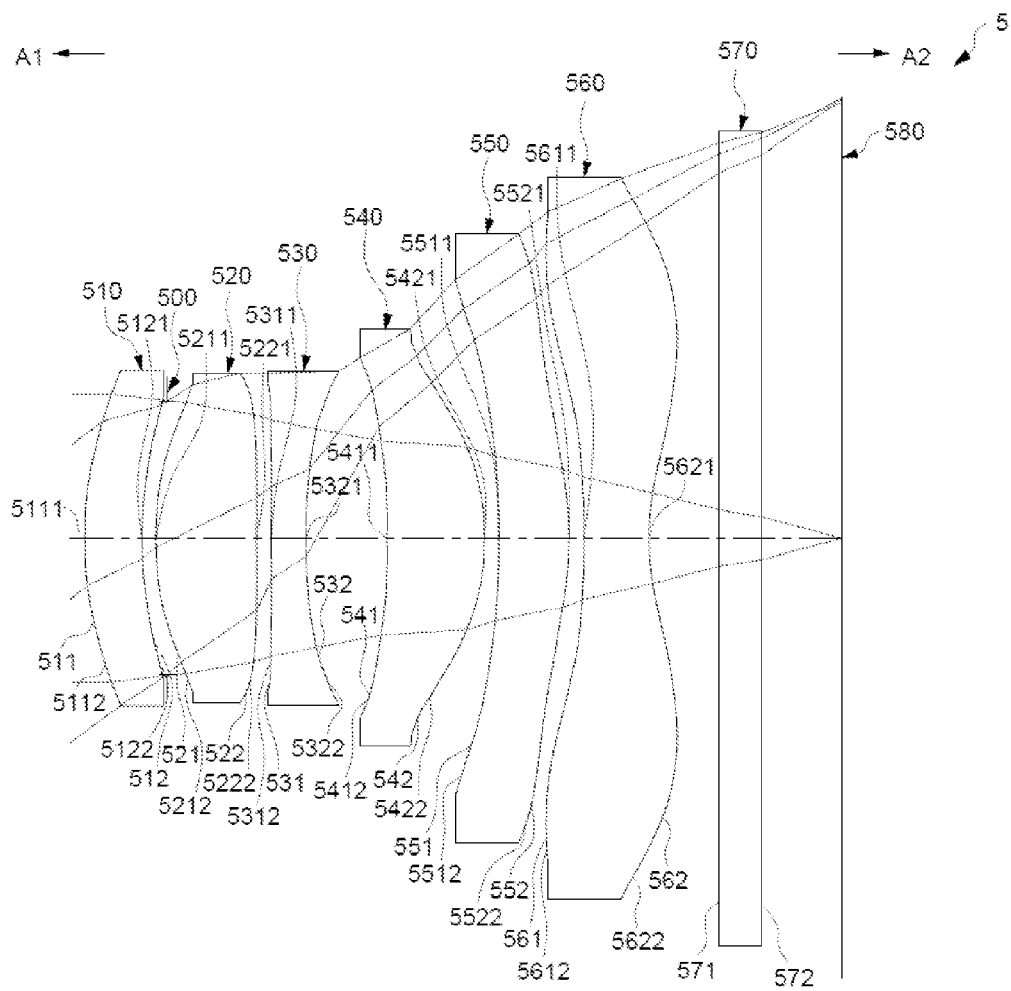
FIG. 18 is a cross-sectional view of a fifth embodiment of an optical imaging lens having six lens elements according to the present disclosures.
Figure 19:
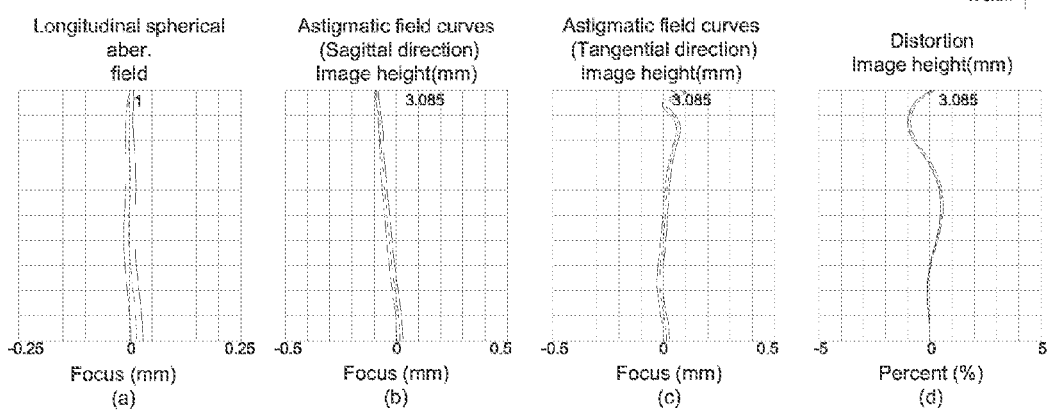
FIG. 19 is a chart of longitudinal spherical aberration and other kinds of optical aberrations of a fifth embodiment of the optical imaging lens according the present disclosures.

Reference is now made to FIGS. 18-21. FIG. 18 illustrates an example cross-sectional view of an optical imaging lens 5 having six lens elements of the optical imaging lens according to a fifth example embodiment. FIG. 19 shows example charts of longitudinal spherical aberration and other kinds of optical aberrations of the optical imaging lens 5 according to the fifth example embodiment. FIG. 20 shows an example table of optical data of each lens element of the optical imaging lens 5 according to the fifth example embodiment. FIG. 21 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 18, the fifth embodiment is similar to the first embodiment. The optical imaging lens 5, in an order from an object side A1 to an image side A2, comprises an aperture stop 500, first lens element to sixth lens element 510-560. A filtering unit 570 and an image plane 580 of an image sensor are positioned at the image side A2 of the optical imaging lens 5. The arrangement of the convex or concave surface structures, including the object-side surfaces 511, 521, 531, 541, 551, 561 and image-side surfaces 512, 522, 532, 542, 552, 562 are generally same with the optical imaging lens 1.

Please refer to FIG. 20 for the optical characteristics of each lens elements in the optical imaging lens 5 and thicknesses of the air gaps of the present embodiment, in which the values of Gaa/G45, ALT/G23, Gaa/T5, Gaa/T3, ALT/T6, ALT/G56, Gaa/T2, TTL/T1, and Gaa/T1 are:
Gaa/G45=14.964, satisfying Equation (1), and (1');
ALT/G23=30.694, satisfying Equation (2), and (2');
Gaa/T5=2.967, satisfying Equation (3), and (3');
Gaa/T3=6.084, satisfying Equation (4), and (4');
ALT/T6=6.574, satisfying Equation (5), and (5');
TTL/T1=11.080, satisfying Equation (6), and (6');
ALT/G56=29.042, satisfying Equation (7), and (7');
Gaa/T2=2.040, satisfying Equation (8), and (8'); and
Gaa/T1=3.638, satisfying Equation (9), and (9').

The system length of the optical imaging lens, TTL, i.e. the distance from the object-side surface 511 of the first lens element 510 to the image plane 580 along the optical axis is 4.447 mm, and the length of the optical imaging lens 5 is indeed shortened.

As shown in FIGS. 19(a)-19(d), the optical imaging lens 5 of the present embodiment shows great characteristics in longitudinal spherical aberration 19(a), astigmatism in the sagittal direction 19(b), astigmatism in the tangential direction 19(c), and distortion aberration 19(d). Therefore, according to the above illustration, the optical imaging lens of the present embodiment indeed shows great optical performance and the length of the optical imaging lens 5 is effectively shortened.

Figure 22:
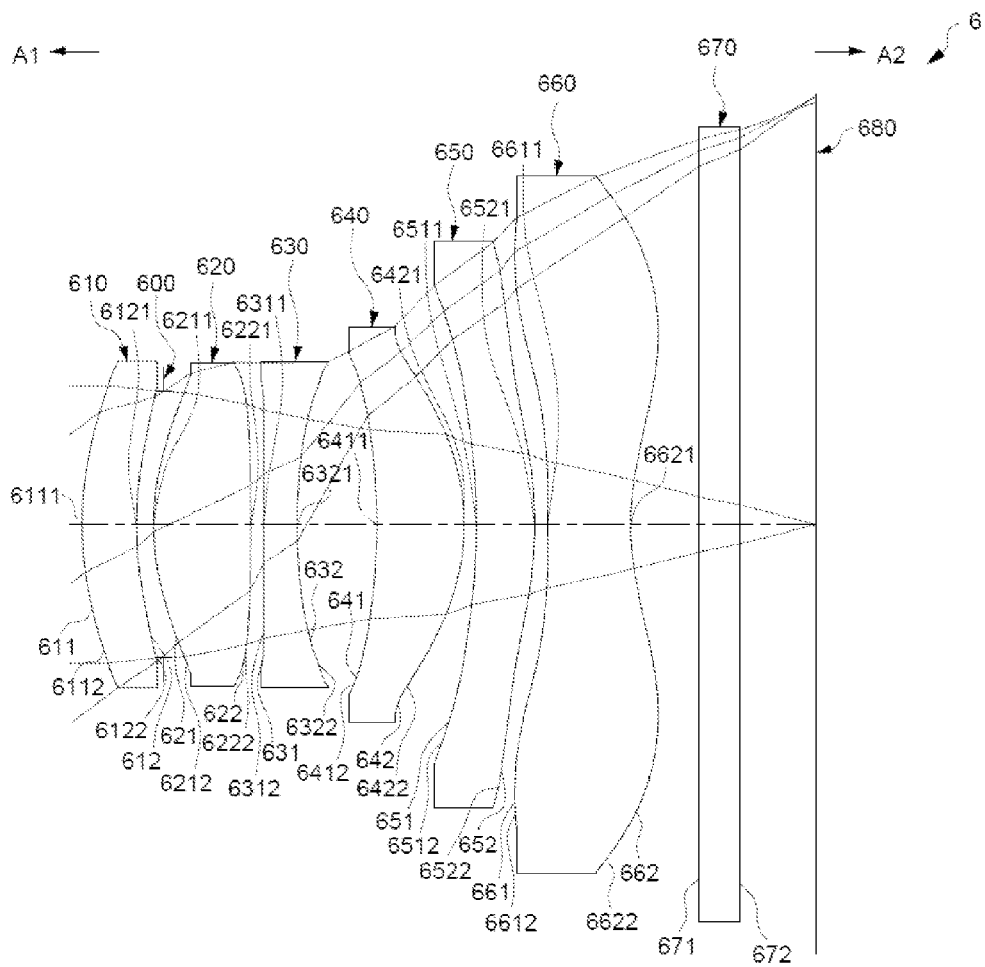
FIG. 22 is a cross-sectional view of a sixth embodiment of an optical imaging lens having six lens elements according to the present disclosures.
Figure 23:
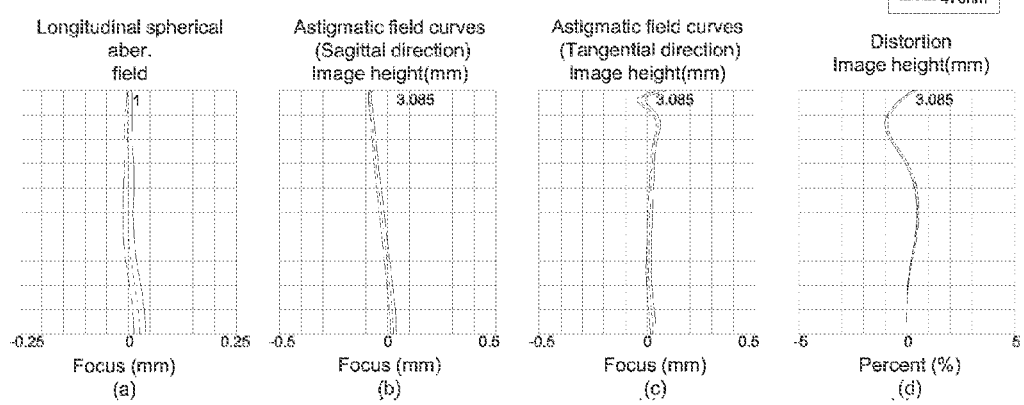
FIG. 23 is a chart of longitudinal spherical aberration and other kinds of optical aberrations of a sixth embodiment of the optical imaging lens according the present disclosures.

Reference is now made to FIGS. 22-25. FIG. 22 illustrates an example cross-sectional view of an optical imaging lens 6 having six lens elements of the optical imaging lens according to a sixth example embodiment. FIG. 23 shows example charts of longitudinal spherical aberration and other kinds of optical aberrations of the optical imaging lens 6 according to the sixth example embodiment. FIG. 24 shows an example table of optical data of each lens element of the optical imaging lens 6 according to the sixth example embodiment. FIG. 25 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 22, the sixth embodiment is similar to the first embodiment. The optical imaging lens 6, in an order from an object side A1 to an image side A2, comprises an aperture stop 600, first lens element to sixth lens element 610-660. A filtering unit 670 and an image plane 680 of an image sensor are positioned at the image side A2 of the optical imaging lens 6. The arrangement of the convex or concave surface structures, including the object-side surfaces 611, 621, 631, 641, 551, 661 and image-side surfaces 612, 622, 632, 642, 652, 662 are generally same with the optical imaging lens 1. The difference between the optical imaging lens 1 and the optical imaging lens 6 is the radius of curvature, the values of the central thicknesses of the lens elements 610-660 and the air gaps between the lens elements 610-660 are slight different from the values of the optical imaging lens 1.

Please refer to FIG. 24 for the optical characteristics of each lens elements in the optical imaging lens 6 and thicknesses of the air gaps of the present embodiment, in which the values of Gaa/G45, ALT/G23, Gaa/T5, Gaa/T3, ALT/T6, ALT/G56, Gaa/T2, TTL/T1, and Gaa/T1 are:
Gaa/G45=16.536, satisfying Equation (1), and (1');
ALT/G23=30.807, satisfying Equation (2), and (2');
Gaa/T5=3.424, satisfying Equation (3), and (3');
Gaa/T3=6.134, satisfying Equation (4), and (4');
ALT/T6=5.021, satisfying Equation (5), and (5');
TTL/T1=11.416, satisfying Equation (6), and (6');
ALT/G56=32.652;
Gaa/T2=2.110, satisfying Equation (8), and (8'); and
Gaa/T1=3.771, satisfying Equation (9), and (9').

The system length of the optical imaging lens, TTL, i.e. the distance from the object-side surface 611 of the first lens element 610 to the image plane 680 along the optical axis is 4.456 mm, and the length of the optical imaging lens 6 is indeed shortened.

As shown in FIGS. 23(a)-23(d), the optical imaging lens 6 of the present embodiment shows great characteristics in longitudinal spherical aberration 23(a), astigmatism in the sagittal direction 23(b), astigmatism in the tangential direction 23(c), and distortion aberration 23(d). Therefore, according to the above illustration, the optical imaging lens of the present embodiment indeed shows great optical performance and the length of the optical imaging lens 6 is effectively shortened.

Figure 26:
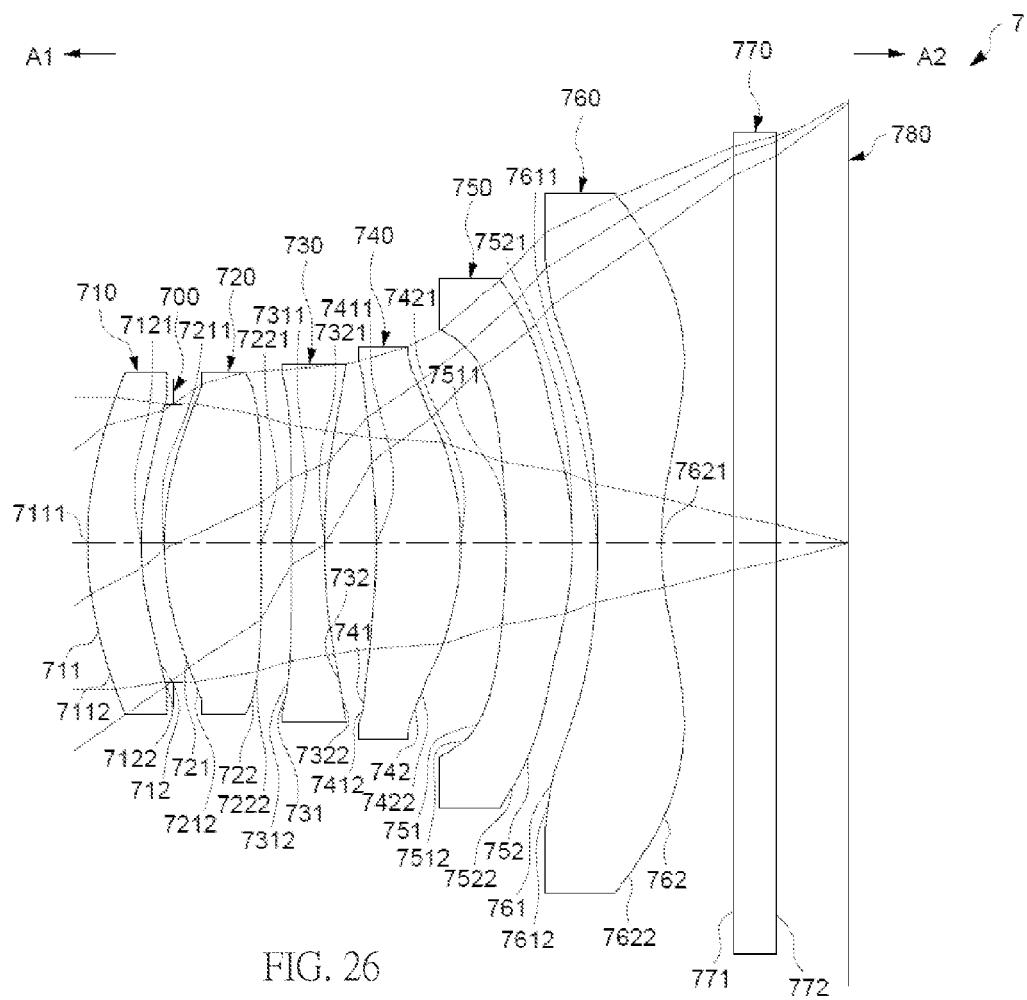
FIG. 26 is a cross-sectional view of a seventh embodiment of an optical imaging lens having six lens elements according to the present disclosures.
Figure 27:
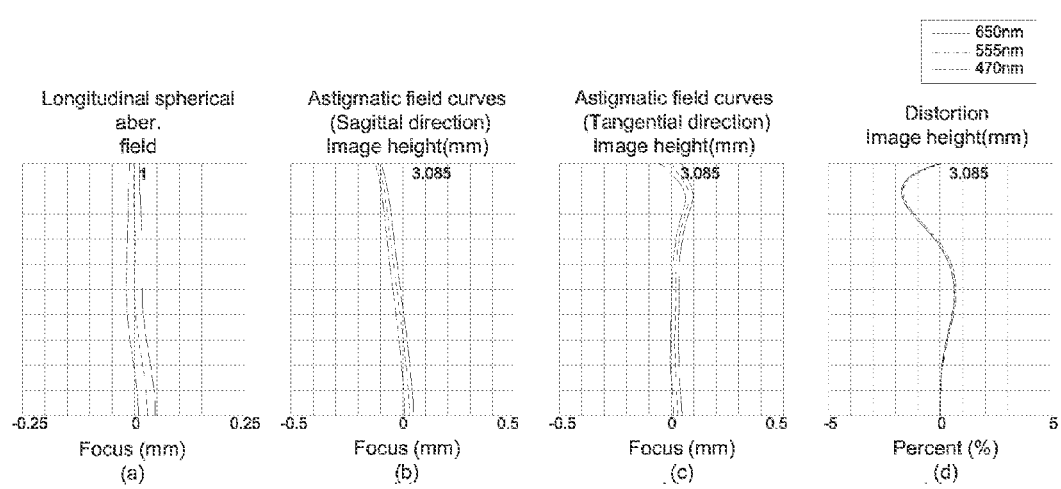
FIG. 27 is a chart of longitudinal spherical aberration and other kinds of optical aberrations of a seventh embodiment of the optical imaging lens according the present disclosures.

Reference is now made to FIGS. 26-29. FIG. 26 illustrates an example cross-sectional view of an optical imaging lens 7 having six lens elements of the optical imaging lens according to a seventh example embodiment. FIG. 27 shows example charts of longitudinal spherical aberration and other kinds of optical aberrations of the optical imaging lens 7 according to the seventh example embodiment. FIG. 28 shows an example table of optical data of each lens element of the optical imaging lens 7 according to the seventh example embodiment. FIG. 29 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 26, the seventh embodiment is similar to the first embodiment. The optical imaging lens 7, in an order from an object side A1 to an image side A2, comprises an aperture stop 700, first lens element to sixth lens element 710-760. A filtering unit 770 and an image plane 780 of an image sensor are positioned at the image side A2 of the optical imaging lens 7. The arrangement of the convex or concave surface structures, including the object-side surfaces 711, 721, 731, 741, 751, 761 and image-side surfaces 712, 722, 732, 742, 752, 762 are generally same with the optical imaging lens 1. The difference between the optical imaging lens 1 and the optical imaging lens 7 is the radius of curvature, the values of the central thicknesses of the lens elements 710-760 and the air gaps between the lens elements 710-760 are slight different from the values of the optical imaging lens 1.

Please refer to FIG. 28 for the optical characteristics of each lens elements in the optical imaging lens 7 and thicknesses of the air gaps of the present embodiment, in which the values of Gaa/G45, ALT/G23, Gaa/T5, Gaa/T3, ALT/T6, ALT/G56, Gaa/T2, TTL/T1, and Gaa/T1 are:
  Gaa/G45=5.448, satisfying Equation (1), and (1');
  ALT/G23=13.478, satisfying Equation (2), and (2');
  Gaa/T5=3.735, satisfying Equation (3), and (3');
  Gaa/T3=7.120;
  ALT/T6=6.246, satisfying Equation (5), and (5');
  TTL/T1=11.874;
  ALT/G56=15.520, satisfying Equation (7), and (7');
  Gaa/T2=2.540, satisfying Equation (8), and (8'); and
  Gaa/T1=4.511.

The system length of the optical imaging lens, TTL, i.e. the distance from the object-side surface 711 of the first lens element 710 to the image plane 780 along the optical axis is 4.498 mm, and the length of the optical imaging lens 7 is indeed shortened.

As shown in FIGS. 27(a)-27(d), the optical imaging lens 7 of the present embodiment shows great characteristics in longitudinal spherical aberration 27(a), astigmatism in the sagittal direction 27(b), astigmatism in the tangential direction 27(c), and distortion aberration 27(d). Therefore, according to the above illustration, the optical imaging lens of the present embodiment indeed shows great optical performance and the length of the optical imaging lens 7 is effectively shortened.

Figure 30:
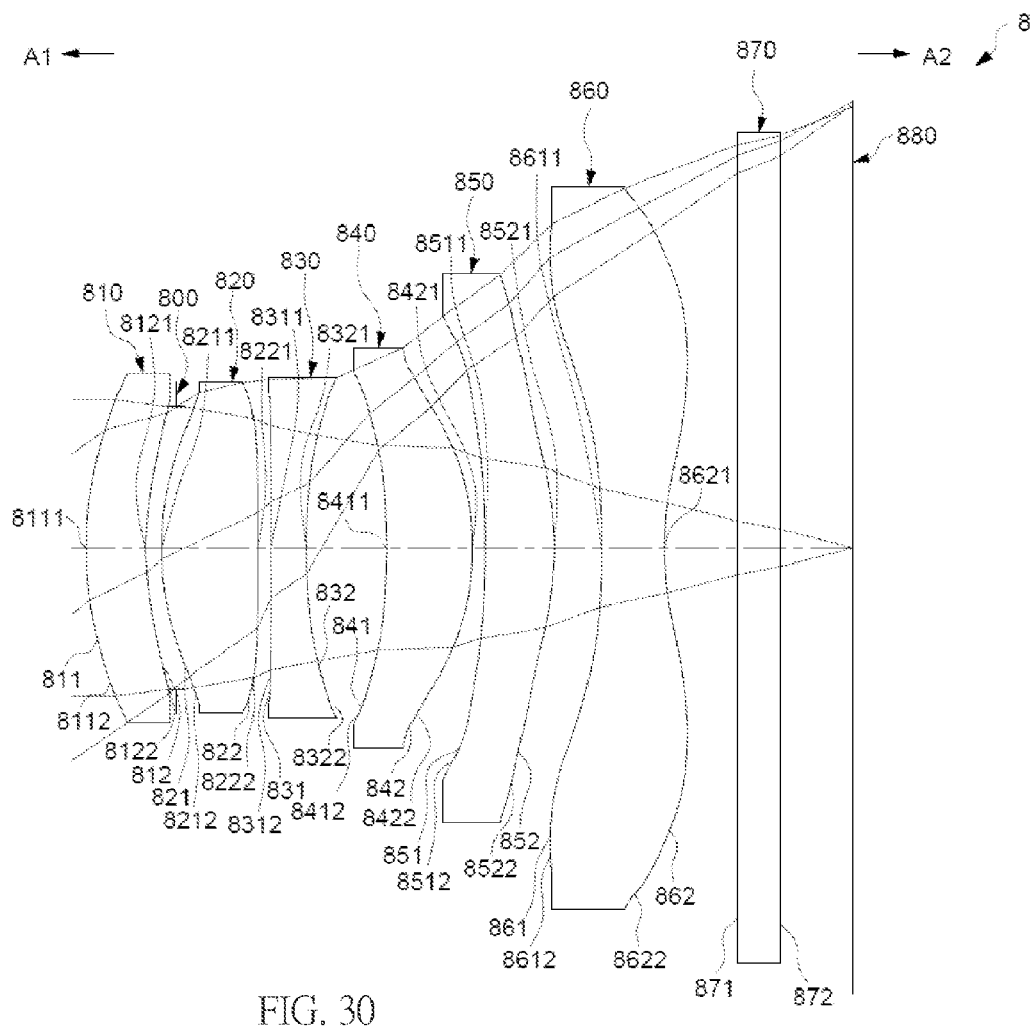
FIG. 30 is a cross-sectional view of an eighth embodiment of an optical imaging lens having six lens elements according to the present disclosures.
Figure 31:
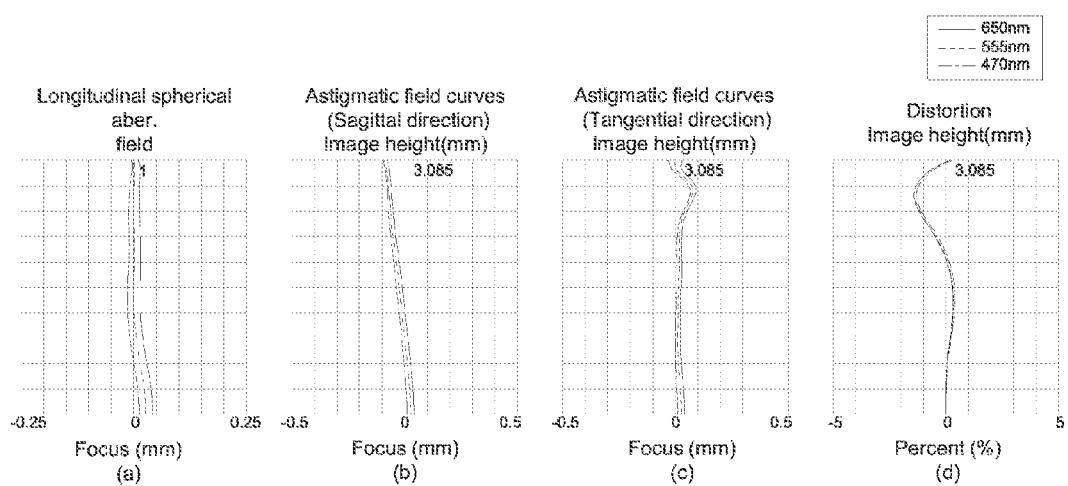
FIG. 31 is a chart of longitudinal spherical aberration and other kinds of optical aberrations of an eighth embodiment of the optical imaging lens according the present disclosures.

Reference is now made to FIGS. 30-33. FIG. 30 illustrates an example cross-sectional view of an optical imaging lens 8 having six lens elements of the optical imaging lens according to an eighth example embodiment. FIG. 31 shows example charts of longitudinal spherical aberration and other kinds of optical aberrations of the optical imaging lens 8 according to the eighth example embodiment. FIG. 32 shows an example table of optical data of each lens element of the optical imaging lens 8 according to the eighth example embodiment. FIG. 33 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 30, the eighth embodiment is similar to the first embodiment. The optical imaging lens 8, in an order from an object side A1 to an image side A2, comprises an aperture stop 800, first lens element to sixth lens element 810-860. A filtering unit 870 and an image plane 880 of an image sensor are positioned at the image side A2 of the optical imaging lens 8. The arrangement of the convex or concave surface structures, including the object-side surfaces 811, 821, 831, 841, 851, 861 and image-side surfaces 812, 822, 832, 842, 852, 862 are generally same with the optical imaging lens 1. The difference between the optical imaging lens 1 and the optical imaging lens 8 is the radius of curvature, the values of the central thicknesses of the lens elements 810-860 and the air gaps between the lens elements 810-860 are slight different from the values of the optical imaging lens 1.

Please refer to FIG. 32 for the optical characteristics of each lens elements in the optical imaging lens 8 and thicknesses of the air gaps of the present embodiment, in which the values of Gaa/G45, ALT/G23, Gaa/T5, Gaa/T3, ALT/T6, ALT/G56, Gaa/T2, TTL/T1, and Gaa/T1 are:
  Gaa/G45=18.353, satisfying Equation (1), and (1');
  ALT/G23=28.866, satisfying Equation (2), and (2');
  Gaa/T5=3.567, satisfying Equation (3), and (3');
  Gaa/T3=6.900;
  ALT/T6=6.407, satisfying Equation (5), and (5');
  TTL/T1=10.900, satisfying Equation (6), and (6');
  ALT/G56=8.604, satisfying Equation (7), and (7');
  Gaa/T2=2.530, satisfying Equation (8), and (8'); and
  Gaa/T1=4.511.

The system length of the optical imaging lens, TTL, i.e. the distance from the object-side surface 811 of the first lens element 810 to the image plane 880 along the optical axis is 4.497 mm, and the length of the optical imaging lens 8 is indeed shortened.

As shown in FIGS. 31(a)-31(d), the optical imaging lens 8 of the present embodiment shows great characteristics in longitudinal spherical aberration 31(a), astigmatism in the sagittal direction 31(b), astigmatism in the tangential direction 31(c), and distortion aberration 31(d). Therefore, according to the above illustration, the optical imaging lens of the present embodiment indeed shows great optical performance and the length of the optical imaging lens 8 is effectively shortened.

Figure 34:
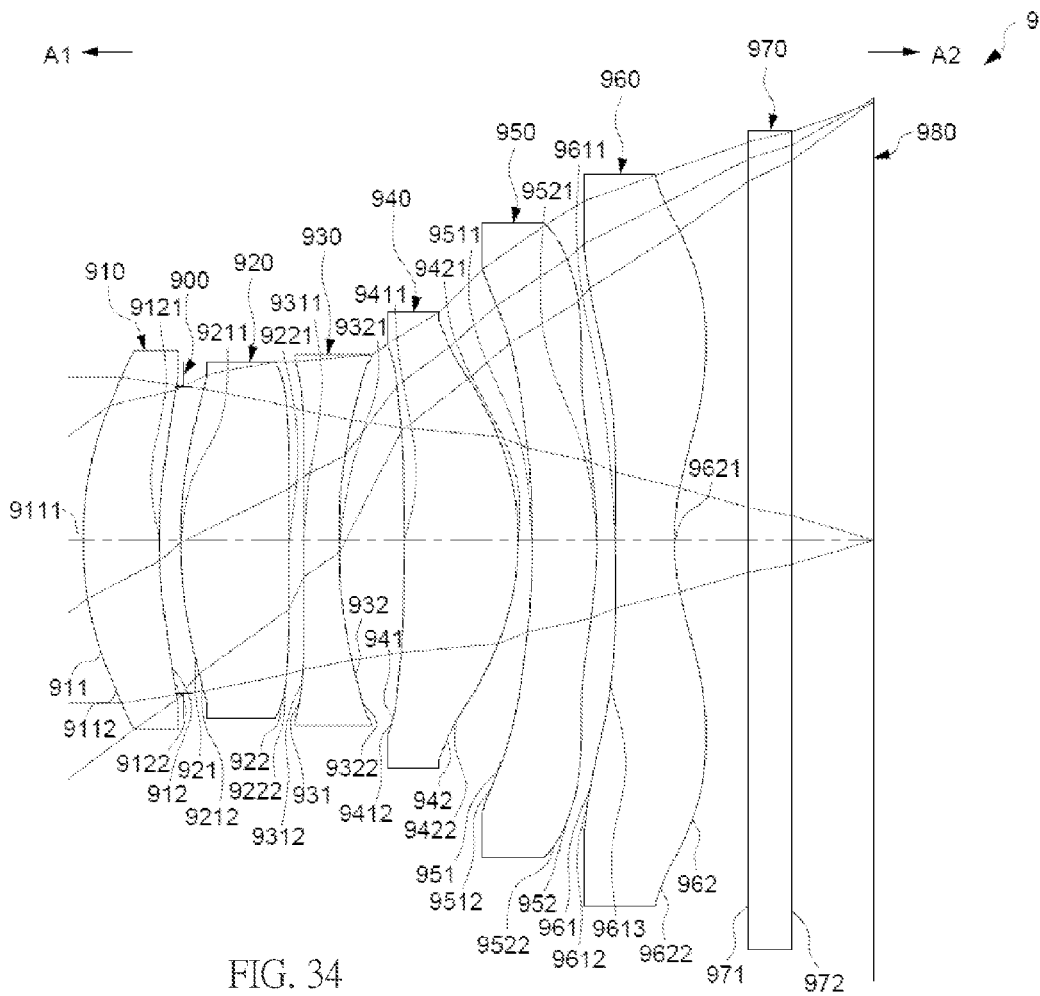
FIG. 34 is a cross-sectional view of a ninth embodiment of an optical imaging lens having six lens elements according to the present disclosures.
Figure 35:
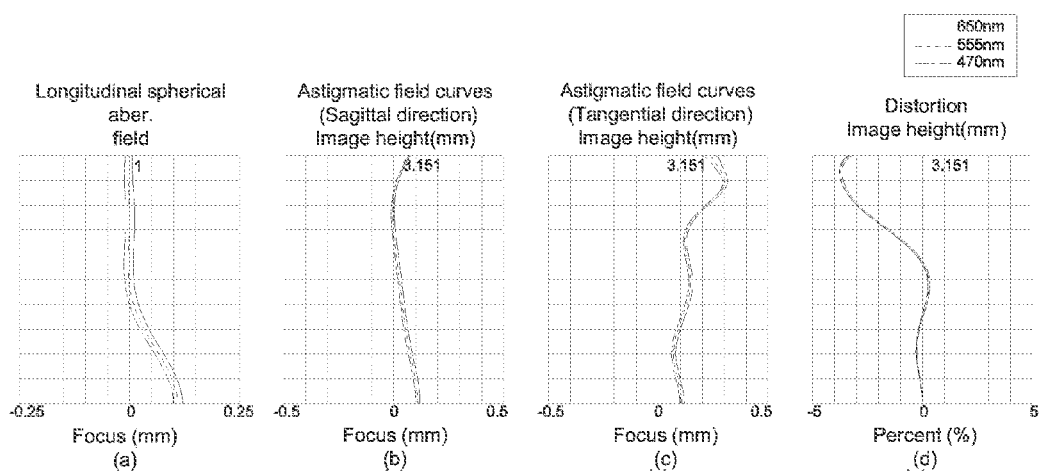
FIG. 35 is a chart of longitudinal spherical aberration and other kinds of optical aberrations of a ninth embodiment of the optical imaging lens according the present disclosures.

Reference is now made to FIGS. 34-37. FIG. 34 illustrates an example cross-sectional view of an optical imaging lens 9 having six lens elements of the optical imaging lens according to a ninth example embodiment. FIG. 35 shows example charts of longitudinal spherical aberration and other kinds of optical aberrations of the optical imaging lens 9 according to the ninth example embodiment. FIG. 36 shows an example table of optical data of each lens element of the optical imaging lens 9 according to the ninth example embodiment. FIG.

37 shows an example table of aspherical data of the optical imaging lens 9 according to the ninth example embodiment. The reference numbers labeled in the present embodiment are similar to those in the first embodiment for the similar elements, but here the reference numbers are initialed with 9, for example, reference number 931 for labeling the object-side surface of the third lens element 930, reference number 932 for labeling the image-side surface of the third lens element 930, etc.

As shown in FIG. 34, the ninth embodiment is similar to the first embodiment. The optical imaging lens 9, in an order from an object side A1 to an image side A2, comprises an aperture stop 900, first lens element to sixth lens element 910-960. A filtering unit 970 and an image plane 980 of an image sensor are positioned at the image side A2 of the optical imaging lens 9. The arrangement of the convex or concave surface structures, including the object-side surfaces 911, 921, 931, 941, 951 and image-side surfaces 912, 922, 932, 942, 952, 962 are generally same with the optical imaging lens 1. The difference between the optical imaging lens 1 and the optical imaging lens 9 is the radius of curvature, the values of the central thicknesses of the lens elements 910-960 and the air gaps between the lens elements 910-960 are slight different from the values of the optical imaging lens 1. Besides, the lens element 960 is slight different from that in the first embodiment. More specifically, the object-side surface 961 of the sixth lens element 960 comprises a convex portion 9611 in a vicinity of the optical axis, a convex portion 9612 in a vicinity of a periphery of the sixth lens element 960, and a concave portion 9613 in a vicinity between the optical axis and the periphery of the sixth lens element.

Please refer to FIG. 36 for the optical characteristics of each lens elements in the optical imaging lens 9 and thicknesses of the air gaps of the present embodiment, in which the values of Gaa/G45, ALT/G23, Gaa/T5, Gaa/T3, ALT/T6, ALT/G56, Gaa/T2, TTL/T1, and Gaa/T1 are:

Gaa/G45=14.706, satisfying Equation (1), and (1');
ALT/G23=32.663, satisfying Equation (2), and (2');
Gaa/T5=3.193, satisfying Equation (3), and (3');
Gaa/T3=5.770, satisfying Equation (4), and (4');
ALT/T6=7.711, satisfying Equation (5), and (5');
TTL/T1=8.768, satisfying Equation (6), and (6');
ALT/G56=24.230, satisfying Equation (7), and (7');
Gaa/T2=1.909, satisfying Equation (8), and (8'); and
Gaa/T1=2.730, satisfying Equation (9), and (9').

The system length of the optical imaging lens, TTL, i.e. the distance from the object-side surface 911 of the first lens element 910 to the image plane 980 along the optical axis is 4.540 mm, and the length of the optical imaging lens 9 is indeed shortened.

As shown in FIGS. 35(a)-35(d), the optical imaging lens 9 of the present embodiment shows great characteristics in longitudinal spherical aberration 35(a), astigmatism in the sagittal direction 35(b), astigmatism in the tangential direction 35(c), and distortion aberration 35(d). Therefore, according to the above illustration, the optical imaging lens of the present embodiment indeed shows great optical performance and the length of the optical imaging lens 9 is effectively shortened.

Figure 38:
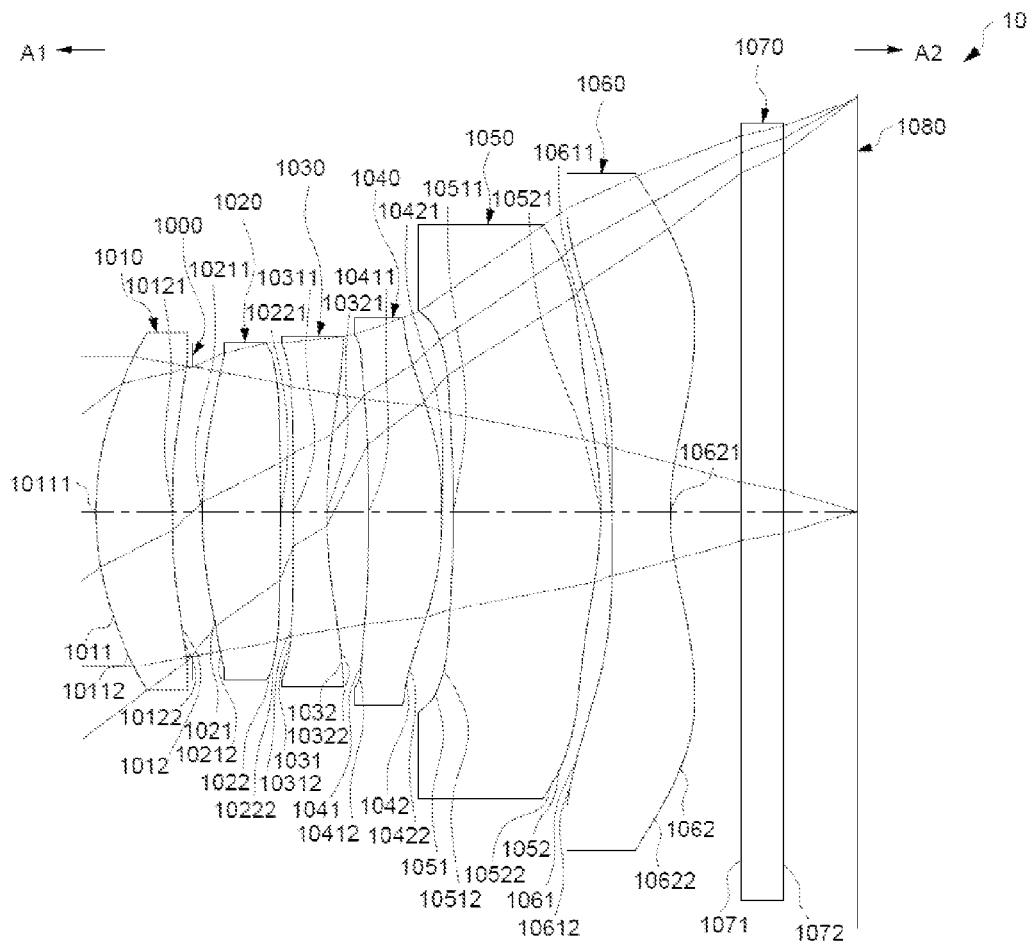
FIG. 38 is a cross-sectional view of a tenth embodiment of an optical imaging lens having six lens elements according to the present disclosures.
Figure 39:
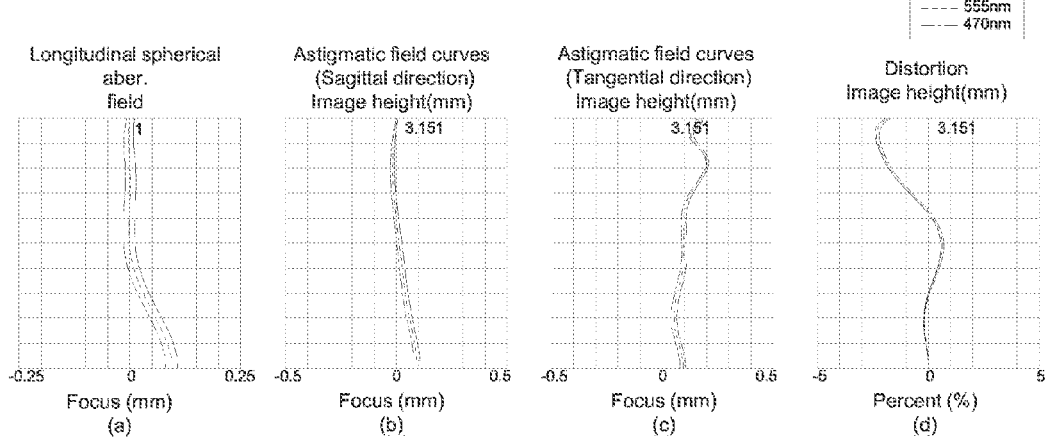
FIG. 39 is a chart of longitudinal spherical aberration and other kinds of optical aberrations of a tenth embodiment of the optical imaging lens according the present disclosures.

Reference is now made to FIGS. 38-41. FIG. 38 illustrates an example cross-sectional view of an optical imaging lens 10 having six lens elements of the optical imaging lens according to a tenth example embodiment. FIG. 39 shows example charts of longitudinal spherical aberration and other kinds of optical aberrations of the optical imaging lens 10 according to the tenth example embodiment. FIG. 40 shows an example table of optical data of each lens element of the optical imaging lens 10 according to the tenth example embodiment. FIG. 41 shows an example table of aspherical data of the optical imaging lens 10 according to the tenth example embodiment. The reference numbers labeled in the present embodiment are similar to those in the first embodiment for the similar elements, but here the reference numbers are initialed with 10, for example, reference number 1031 for labeling the object-side surface of the third lens element 1030, reference number 1032 for labeling the image-side surface of the third lens element 1030, etc.

As shown in FIG. 38, the tenth embodiment is similar to the first embodiment. The optical imaging lens 10, in an order from an object side A1 to an image side A2, comprises an aperture stop 1000, first lens element to sixth lens element 1010-1060. A filtering unit 1070 and an image plane 1080 of an image sensor are positioned at the image side A2 of the optical imaging lens 10. The arrangement of the convex or concave surface structures, including the object-side surfaces 1011, 1021, 1031, 1041, 1051 and image-side surfaces 1012, 1022, 1032, 1042, 1052, 1062 are generally same with the optical imaging lens 1. The difference between the optical imaging lens 1 and the optical imaging lens 10 is the radius of curvature, the values of the central thicknesses of the lens elements 1010-1060 and the air gaps between the lens elements 1010-1060 are slight different from the values of the optical imaging lens 1. Besides, the lens element 1060 is slight different from that in the first embodiment. More specifically, the object-side surface 1061 of the sixth lens element 1060 comprises a convex portion 10611 in a vicinity of the optical axis, and a concave portion 10612 in a vicinity of a periphery of the sixth lens element 1060.

Please refer to FIG. 40 for the optical characteristics of each lens elements in the optical imaging lens 10 and thicknesses of the air gaps of the present embodiment, in which the values of Gaa/G45, ALT/G23, Gaa/T5, Gaa/T3, ALT/T6, ALT/G56, Gaa/T2, TTL/T1, and Gaa/T1 are:

Gaa/G45=16.851, satisfying Equation (1), and (1');
ALT/G23=36.654, satisfying Equation (2), and (2');
Gaa/T5=1.199, satisfying Equation (3), and (3');
Gaa/T3=5.122, satisfying Equation (4), and (4');
ALT/T6=7.882, satisfying Equation (5), and (5');
TTL/T1=8.508, satisfying Equation (6), and (6');
ALT/G56=41.114;
Gaa/T2=2.273, satisfying Equation (8), and (8'); and
Gaa/T1=2.330, satisfying Equation (9), and (9').

The system length of the optical imaging lens, TTL, i.e. the distance from the object-side surface 1011 of the first lens element 1010 to the image plane 1080 along the optical axis is 4.582 mm, and the length of the optical imaging lens 10 is indeed shortened.

As shown in FIGS. 39(a)-39(d), the optical imaging lens 10 of the present embodiment shows great characteristics in longitudinal spherical aberration 39(a), astigmatism in the sagittal direction 35(b), astigmatism in the tangential direction 39(c), and distortion aberration 39(d). Therefore, according to the above illustration, the optical imaging lens of the present embodiment indeed shows great optical performance and the length of the optical imaging lens 10 is effectively shortened.

Please refer to FIG. 42 which shows the values of TTL, ALT, Gaa, Gaa/G45, ALT/G23, Gaa/T5, Gaa/T3, ALT/T6, ALT/G56, Gaa/T2, TTL/T1, and Gaa/T1 of all ten embodiments, and it is clear that the optical imaging lens of the present invention satisfy the Equations (1) and/or (1'), (2) and/or (2'), (3) and/or (3'), (4) and/or (4'), (5) and/or (5'), (6) and/or (6'), (7) and/or (7'), (8) and/or (8'), or (9) and/or (9').

Please refer to FIG. 43, which shows an example structural view of a first embodiment of mobile device 20 applying an aforesaid optical imaging lens. The mobile device 20 comprises a housing 21 and a photography module 22 positioned in the housing 21. An example of the mobile device 20 may be, but is not limited to, a mobile phone.

As shown in FIG. 43, the photography module 22 may comprise an aforesaid optical imaging lens, for example the optical imaging lens 1 of the first embodiment, a lens barrel 23 for positioning the optical imaging lens 1, a module housing unit 24 for positioning the lens barrel 23, a substrate 182 for positioning the module housing unit 24, and an image sensor 181 which is positioned at an image side of the optical imaging lens 1. The image plane 180 is formed on the image sensor 181.

In some other example embodiments, the structure of the filtering unit 170 may be omitted. In some example embodiments, the housing 21, the lens barrel 23, and/or the module housing unit 24 may be integrated into a single component or assembled by multiple components. In some example embodiments, the image sensor 181 used in the present embodiment is directly attached to a substrate 182 in the form of a chip on board (COB) package, and such package is different from traditional chip scale packages (CSP) since COB package does not require a cover glass before the image sensor 181 in the optical imaging lens 1. Aforesaid exemplary embodiments are not limited to this package type and could be selectively incorporated in other described embodiments.

The six lens elements 110, 120, 130, 140, 150, 160 are positioned in the lens barrel 23 in the way of separated by an air gap between any two adjacent lens elements.

The module housing unit 24 comprises a seat element 2401 for positioning the lens barrel 23 and an image sensor backseat 2406, in which the image sensor backseat 2406 is not necessary in other embodiment. The lens barrel 23 and the seat element 2401 are positioned along a same axis I-I', and the lens barrel 23 is positioned inside the seat element 2401.

Because the length of the optical imaging lens 1 is merely 4.514 (mm), the size of the mobile device 20 may be quite small. Therefore, the embodiments described herein meet the market demand for smaller sized product designs.

Reference is now made to FIG. 44, which shows another structural view of a second embodiment of mobile device 20' applying the aforesaid optical imaging lens 1. One difference between the mobile device 20' and the mobile device 20 may be the seat element 2401 further comprises a first lens seat 2402, a second lens seat 2403, a coil 2404, and a magnetic unit 2405. The first lens seat 2402, which is close to the outside of the lens barrel 23, and the lens barrel 23 are positioned along an axis II'. The second lens seat 2403 is positioned along the axis II' and around the outside of the first lens seat 2402. The coil 2404 is positioned between the outside of the first lens seat 2402 and the inside of the second lens seat 2403. The magnetic unit 2405 is positioned between the outside of the coil 2404 and the inside of the second lens seat 2403. The end facing to the image side of the image sensor backseat 2406 is close to the second lens seat 2403.

The lens barrel 23 and the optical imaging lens 1 positioned therein are driven by the first lens seat 2402 to move along the axis II'. The rest structure of the mobile device 20' is similar to the mobile device 20.

Similarly, because the length of the optical imaging lens 4.514 mm, is shortened, the mobile device 20' may be designed with a smaller size and meanwhile good optical performance is still provided. Therefore, the present embodiment meets the market demand for smaller sized product designs, and maintains good optical characteristics and image quality. Accordingly, the present embodiment not only reduces raw material amount of housing for economic benefits, but also meets smaller sized product design trend and consumer demand.

According to above illustration, it is clear that the mobile device and the optical imaging lens thereof in example embodiments, through controlling ratio of at least one central thickness of lens element to a sum of all air gaps along the optical axis between six lens elements in a predetermined range, and incorporated with detail structure and/or reflection power of the lens elements, the length of the optical imaging lens is effectively shortened and meanwhile good optical characters are still provided.

While various embodiments in accordance with the disclosed principles have been described above, it should be understood that they have been presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, comprising:
   a first lens element, a second lens element, a third lens element, a fourth lens element, a fifth lens element and a sixth lens element;
   wherein each of the lens elements are arranged sequentially from an object side to an image side along an optical axis;
   wherein each of the lens elements comprises an object-side surface facing toward the object side and an image-side surface facing toward the image side;
   wherein each of the object-side surfaces and the image-side surfaces has a vicinity of the optical axis and a vicinity of a periphery of each lens element;
   wherein the first lens element comprises a positive refractive power;
   wherein the object-side surface of the second lens element comprises a convex portion in the vicinity of the optical axis, and the second lens element comprises a positive refractive power;
   wherein the object-side surface of the third lens element comprises a concave portion in the vicinity of the optical axis, the image-side surface of the third lens element comprises a concave portion in the vicinity of the optical axis, and the third lens element comprises a negative refractive power;

wherein the image-side surface of the fourth lens element comprises a convex portion in the vicinity of the optical axis, and the fourth lens element comprises a positive refractive power; and wherein the image-side surface of the sixth lens element comprises a concave portion in the vicinity of the optical axis and a convex portion in the vicinity of the periphery of said sixth lens element;

the optical imaging lens as a whole comprises only the six lens elements each comprising refractive power.

2. The optical imaging lens according to claim 1, wherein a central thickness of said second lens element along the optical axis is represented by T2, a central thickness of said fifth lens element along the optical axis is represented by T5, and T2 and T5 satisfy the equation:

$T2 > T5.$

3. A mobile device, comprising:
a housing; and
a photography module positioned in the housing and comprising:
  a lens barrel;
  an optical imaging lens as claimed in claim 1 and positioned in the lens barrel;
  a module housing unit for positioning the lens barrel; and
  an image sensor positioned at the image side of the optical imaging lens.

4. The optical imaging lens according to claim 1, wherein the image-side surface of the second lens element comprises a convex portion in the vicinity of the optical axis, and the image-side surface of the third lens element comprises a concave portion in the vicinity of the periphery of said third lens element.

5. The optical imaging lens according to claim 4, wherein the sum of all five air gaps from the first lens element to the sixth lens element along the optical axis is represented by Gaa, an air gap between the fourth lens element and the fifth lens element along the optical axis is represented by G45, and Gaa and G45 satisfy the equation:

$(Gaa/G45) \leq 21.0.$

6. The optical imaging lens according to claim 5, wherein the sum of the thickness of all six lens elements along the optical axis is represented by ALT, an air gap between the second lens element and the third lens element along the optical axis is represented by G23, and ALT and G23 satisfy:

$ALT/G23 \leq 55.0.$

7. The optical imaging lens according to claim 6, wherein a central thickness of said fifth lens element along the optical axis is represented by T5, and Gaa and T5 satisfy the equation:

$Gaa/T5 \leq 3.85.$

8. The optical imaging lens according to claim 7, wherein a central thickness of said third lens element along the optical axis is represented by T3, and Gaa and T3 satisfy the equation:

$Gaa/T3 \leq 6.5.$

9. The optical imaging lens according to claim 4, wherein the sum of the thickness of all six lens elements along the optical axis is represented by ALT, a central thickness of said sixth lens element along the optical axis is represented by T6, and ALT and T6 satisfy the equation:

$ALT/T6 \leq 8.5.$

10. The optical imaging lens according to claim 9, the sum of all five air gaps from the first lens element to the sixth lens element along the optical axis is represented by Gaa, an air gap between the fourth lens element and the fifth lens element along the optical axis is represented by G45, and Gaa and G45 satisfy the equation:

$Gaa/G45 \leq 21.0.$

11. The optical imaging lens according to claim 10, wherein a central thickness of said third lens element along the optical axis is represented by T3, and Gaa and T3 satisfy the equation:

$Gaa/T3 \leq 6.5.$

12. The optical imaging lens according to claim 11, wherein a distance from said object-side surface of said first lens element to the image side of the optical imaging lens along the optical axis is the system length of the optical imaging lens is represented by TTL, a central thickness of said first lens element along the optical axis is represented by T1, and TTL and T1 satisfy the equation:

$TTL/T1 \leq 11.5.$

13. The optical imaging lens according to claim 4, wherein the sum of the thickness of all six lens elements along the optical axis is represented by ALT, an air gap between the fifth lens element and the sixth lens element along the optical axis is represented by G56, and ALT and G56 satisfy $ALT/G56 \leq 30.0.$ 14. The optical imaging lens according to claim 13, wherein the sum of all five air gaps from the first lens element to the sixth lens element along the optical axis is represented by Gaa, a central thickness of said second lens element along the optical axis is represented by T2, and Gaa and T2 satisfy the equation:

$Gaa/T2 \leq 5.5.$

15. The optical imaging lens according to claim 14, wherein an air gap between the second lens element and the third lens element along the optical axis is represented by G23, and ALT and G23 satisfy the equation:

$ALT/G23 \leq 55.0.$

16. The optical imaging lens according to claim 15, wherein a distance from said object-side surface of said first lens element to the image side of the optical imaging lens along the optical axis is the system length of the optical imaging lens is represented by TTL, a central thickness of said first lens element along the optical axis is represented by T1, and TTL and T1 satisfy the equation:

$TTL/T1 \leq 11.5.$

17. The optical imaging lens according to claim 4, wherein the sum of all five air gaps from the first lens element to the sixth lens element along the optical axis is represented by Gaa, a central thickness of said first lens element along the optical axis is represented by T1, and Gaa and T1 satisfy the equation:

$Gaa/T1 \leq 3.8.$

18. The optical imaging lens according to claim 17, an air gap between the second lens element and the third lens element along the optical axis is represented by G23, and ALT and G23 satisfy the equation:

$ALT/G23 \leq 55.0.$

19. The optical imaging lens according to claim 18, wherein an air gap between the fourth lens element and the fifth lens element along the optical axis is represented by G45, and Gaa and G45 satisfy the equation:

$Gaa/G45 \leq 21.0$.

20. The optical imaging lens according to claim 19, wherein a central thickness of said sixth lens element along the optical axis is represented by T6, and ALT and T6 satisfy the equation:

$ALT/T6 \leq 8.5$.

* * * * *